US012797279B2

(12) United States Patent
Roh

(10) Patent No.: US 12,797,279 B2
(45) Date of Patent: Nov. 17, 2026

(54) WEARABLE DEVICE AND CONTROL METHOD THEREFOR

(71) Applicant: SAMSUNG ELECTRONICS CO., LTD., Suwon-si (KR)

(72) Inventor: Changhyun Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 797 days.

(21) Appl. No.: 18/094,052

(22) Filed: Jan. 6, 2023

(65) Prior Publication Data

US 2023/0149244 A1 May 18, 2023

Related U.S. Application Data

(63) Continuation of application No. PCT/KR2021/001531, filed on Feb. 5, 2021.

(30) Foreign Application Priority Data

Jul. 8, 2020 (KR) ........................ 10-2020-0084041
Sep. 7, 2020 (KR) ........................ 10-2020-0113808

(51) Int. Cl.
*A61H 1/02* (2006.01)

(52) U.S. Cl.
CPC ....... *A61H 1/0244* (2013.01); *A61H 2201/12* (2013.01); *A61H 2201/165* (2013.01);
(Continued)

(58) Field of Classification Search
CPC .. A61H 1/0244–0266; A61H 2001/0248–027; A61H 2201/12;
(Continued)

(56) References Cited

U.S. PATENT DOCUMENTS

2006/0004307 A1* 1/2006 Horst ........................ A61H 3/00 601/5
2010/0049102 A1 2/2010 Yasuhara
(Continued)

FOREIGN PATENT DOCUMENTS

CN 101111211 A 1/2008
CN 108888473 A 11/2018
(Continued)

OTHER PUBLICATIONS

Communication dated Jun. 24, 2025, issued by the Japanese Patent Office in Japanese Application No. 2023-501002.
(Continued)

*Primary Examiner* — Paige Kathleen Bugg
(74) *Attorney, Agent, or Firm* — Sughrue Mion, PLLC

(57) ABSTRACT

A wearable device, includes a motor, a motor driver circuit, a memory, a sensor, and a processor. The memory is configured to store resistance force generation setting information indicating a difference between a reference angle and each joint angle and a corresponding relationship between respective duty ratios. The processor is configured to obtain, using the sensor, a joint angle of a user and calculate a difference between the reference angle and the obtained joint angle. The processor is configured to obtain a duty ratio corresponding to the calculated difference according to the resistance force generation setting information. The processor is further configured to provide a control signal having the obtained duty ratio to the motor driver circuit to perform control such that a control state of the motor driver circuit is switched between a first control state and a second control state.

20 Claims, 23 Drawing Sheets

(52) U.S. Cl.
CPC ................ *A61H 2201/5007* (2013.01); *A61H 2201/5023* (2013.01); *A61H 2201/5061* (2013.01); *A61H 2201/5069* (2013.01)

(58) Field of Classification Search
CPC .... A61H 2201/5007; A61H 2201/5023; A61H 2201/5061; A61H 2201/5069; A61H 2201/165; A61H 1/0274–0288; B25J 9/0006
USPC ........................................................ 601/5, 33
See application file for complete search history.

(56) References Cited

U.S. PATENT DOCUMENTS

| | | | | |
|---|---|---|---|---|
| 2011/0144547 | A1* | 6/2011 | Kusuura | A61H 1/0274 600/587 |
| 2013/0012852 | A1 | 1/2013 | Imaida et al. | |
| 2013/0138020 | A1 | 5/2013 | Yasuhara | |
| 2015/0173929 | A1* | 6/2015 | Kazerooni | A61H 1/00 602/16 |
| 2018/0338880 | A1* | 11/2018 | Ohta | A61H 1/0262 |

FOREIGN PATENT DOCUMENTS

| | | | |
|---|---|---|---|
| CN | 110834329 | A | 2/2020 |
| JP | 2002-301124 | A | 10/2002 |
| JP | 2007-54086 | A | 3/2007 |
| JP | 2009-39454 | A | 2/2009 |
| JP | 2009-95577 | A | 5/2009 |
| JP | 2010-75657 | A | 4/2010 |
| JP | 2011-36376 | A | 2/2011 |
| JP | 2013-111408 | A | 6/2013 |
| JP | 2014-171661 | A | 9/2014 |
| JP | 2014-210573 | A | 11/2014 |
| JP | 2014-223195 | A | 12/2014 |
| JP | 5889367 | B2 | 3/2016 |
| KR | 10-2013-0010609 | A | 1/2013 |
| KR | 10-1836413 | B1 | 3/2018 |
| KR | 10-2018-0033652 | A | 4/2018 |
| KR | 10-2021-0069557 | A | 6/2021 |
| KR | 10-2021-0139115 | A | 11/2021 |

OTHER PUBLICATIONS

Communication dated Dec. 24, 2024, issued by the Japanese Patent Office in Japanese Application No. 2023-501002.
International Search Report (PCT/ISA/210) issued Apr. 13, 2021 in International Application No. PCT/KR2021/001531.
Communication issued on Mar. 24, 2026 by the China National Intellectual Property Administration in Chinese Patent Application No. 202180048501.5.
Communication issued Aug. 21, 2026 by the National Intellectual Property Administration of P.R. China in Chinese Patent Application No. 202180048501.5.

* cited by examiner

WEARABLE DEVICE AND CONTROL METHOD THEREFOR

CROSS-REFERENCE TO RELATED APPLICATIONS

This application is by-pass continuation application of International Application No. PCT/KR2021/001531, filed on Feb. 5, 2021, which claims priority to Korean Patent Application No. 10-2020-0084041, filed on Jul. 8, 2020, and Korean Patent Application No. 10-2020-0113808, filed on Sep. 7, 2020, in the Korean Intellectual Property Office, the disclosures of which are incorporated by reference herein in their entireties.

BACKGROUND

1. Field

The disclosure relates to a wearable device and method for controlling the wearable device to output a resistance force.

2. Description of Related Art

In a rapidly aging society, a growing number of people have experienced inconvenience and pain from joint problems. Accordingly, the elderly and/or patients with joint problems have developed an interest in walking assistance devices that enable walking with less effort. Accordingly, there is a growing need for walking assistance devices for intensifying muscular strength of human bodies.

SUMMARY

Provided are a wearable device and a method for controlling the wearable device for outputting a resistance force.

According to an aspect of the disclosure, a wearable device includes: a motor including at least a first terminal and a second terminal; a motor driver circuit; a memory configured to store resistance force generation setting information indicating a difference between a reference angle and each joint angle and a corresponding relationship between respective duty ratios; a sensor; and a processor configured to: obtain, using the sensor, a joint angle of a user, determine a difference between the reference angle and the obtained joint angle, obtain a duty ratio corresponding to the determined difference according to the resistance force generation setting information, and provide a control signal having the obtained duty ratio to the motor driver circuit to perform control such that a control state of the motor driver circuit is switched between a first control state and a second control state, wherein in the first control state, the first terminal and the second terminal of the motor are in an equipotential state such that a potential of the first terminal and a potential of the second terminal are equal to each other, and wherein in the second control state, the first terminal and the second terminal are electrically opened.

The processor may be further configured to, based on the determined difference increasing, increase the obtained duty ratio according to the resistance force generation setting information.

The motor driver circuit may include a first switch, a second switch, a third switch, and a fourth switch, in the second control state, the processor may be further configured to turn off the first switch and the second switch and apply the control signal to the third switch and the fourth switch to switch the control state of the motor driver circuit to the second control state, and the motor is not electrically connected to a battery included in the wearable device and outputs a resistance force by repeatedly turning on and off the third switch and the fourth switch according to the obtained duty ratio, when the first switch and the second switch are turned off.

The processor may be further configured to, based on the determined difference being less than a set value, turn off switches included in the motor driver circuit such that the control state is the second control state.

The processor may be further configured to: determine whether a rotation direction of a joint of the user matches a predetermined direction, control the control state to be switched between the first control state and the second control state, based on determining that the rotation direction matches the predetermined direction, and turn off switches included in the motor driver circuit such that the control state is the second control state, based on determining that the rotation direction does not match the predetermined direction.

The processor may be further configured to change the reference angle based on a user input.

The motor may be configured to output a resistance force as the control state is switched between the first control state and the second control state, and the output resistance force may be amplified through a first gear attached to a rotation shaft of the motor and a second gear connected to the first gear.

According to an aspect of the disclosure, a wearable device includes: a battery; a motor including at least a first terminal and a second terminal; a motor driver circuit; a memory configured to store resistance force generation setting information indicating a difference between a reference angle and each joint angle and a corresponding relationship between respective duty ratios; a sensor; and a processor configured to: control the motor driver circuit such that the motor outputs a first resistance force based on power supplied from the battery in a first resistance mode, block an electrical connection between the motor and the battery in a second resistance mode, and control the motor driver circuit such that the motor outputs a second resistance force without receiving the power from the battery, wherein, in the second resistance mode, the processor is configured to: obtain a joint angle of a user, using the sensor, determine a difference between the reference angle and the obtained joint angle, obtain a duty ratio corresponding to the determined difference according to the resistance force generation setting information, and provide a control signal having the obtained duty ratio to the motor driver circuit to perform control such that a control state of the motor driver circuit is switched between a first control state and a second control state, and wherein in the first control state, the first terminal and the second terminal of the motor are in an equipotential state such that a potential of the first terminal and a potential of the second terminal are equal to each other, and wherein in the second control state, the first terminal and the second terminal are electrically opened.

The processor may be further configured to, based on the determined difference increasing, increase the obtained duty ratio according to the resistance force generation setting information.

The motor driver circuit may include a first switch, a second switch, a third switch, and a fourth switch, in the second resistance mode, the processor may be further configured to turn off the first switch and the second switch and apply the control signal having the obtained duty ratio to the third switch and the fourth switch, and the motor may be configured to output a resistance force by repeatedly turning on and off the third switch and the fourth switch according to the obtained duty ratio.

In the second resistance mode, the processor may be further configured to, based on the determined difference being less than a set value, turn off switches included in the motor driver circuit such that the control state is the second control state.

The processor may be further configured to: determine whether a rotation direction of a joint of the user matches a predetermined direction, control the control state to be switched between the first control state and the second control state, based on determining that the rotation direction matches the predetermined direction, and turn off switches included in the motor driver circuit such that the control state is the second control state, based on determining the rotation direction does not match the predetermined direction.

The motor may be configured to: output the second resistance force as the control state is switched between the first control state and the second control state, and the output second resistance force is amplified through a first gear attached to a rotation shaft of the motor and a second gear connected to the first gear.

The processor may be further configured to, based the determined difference increasing while a resistance force with a maximum intensity in the second resistance mode is being output to the user, control the motor driver circuit such that the motor outputs a resistance force with an intensity greater than the maximum intensity based on the power received from the battery.

According to an aspect of the disclosure, a method of controlling a wearable device, includes: obtaining a joint angle of a user, using a sensor of the wearable device; determining a difference between a reference angle and the obtained joint angle; obtaining a duty ratio corresponding to the determined difference according to resistance force generation setting information indicating a difference between a reference angle and each joint angle and a corresponding relationship between respective duty ratios; and providing a control signal having the obtained duty ratio to a motor driver circuit of the wearable device to perform control such that a control state of the motor driver circuit is switched between a first control state and a second control state, wherein in the first control state, a first terminal and a second terminal of a motor of the wearable device are in an equipotential state such that a potential of the first terminal and the potential of a second terminal are equal to each other, and wherein in the second control state, the first terminal and the second terminal are electrically opened.

The method may further include increasing the obtained duty ratio according to the resistance force generation setting information based on the determined difference increasing.

The motor driver circuit includes a first switch, a second switch, a third switch, and a fourth switch, and the method may further include: in the second control state, turning off the first switch and the second switch and applying the control signal to the third switch and the fourth switch, and in a state in which the motor is not electrically connected to a battery included in the wearable device and based on the first switch and the second switch being turned off, outputting a resistance force by repeatedly turning on and off the third switch and the fourth switch according to the obtained duty ratio.

The method may further include, based on the determined difference being less than a set value, turning off switches included in the motor driver circuit such that the control state is the second control state.

The method may further include: determining whether a rotation direction of a joint of the user matches a predetermined direction; based on determining that the rotation direction matches the predetermined direction, switching the control state between the first control state and the second control state; and based on determining that the rotation direction does not match the predetermined direction, turning off switches included in the motor driver circuit such that the control state is the second control state.

The method may further include changing the reference angle based on a user input.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1A:
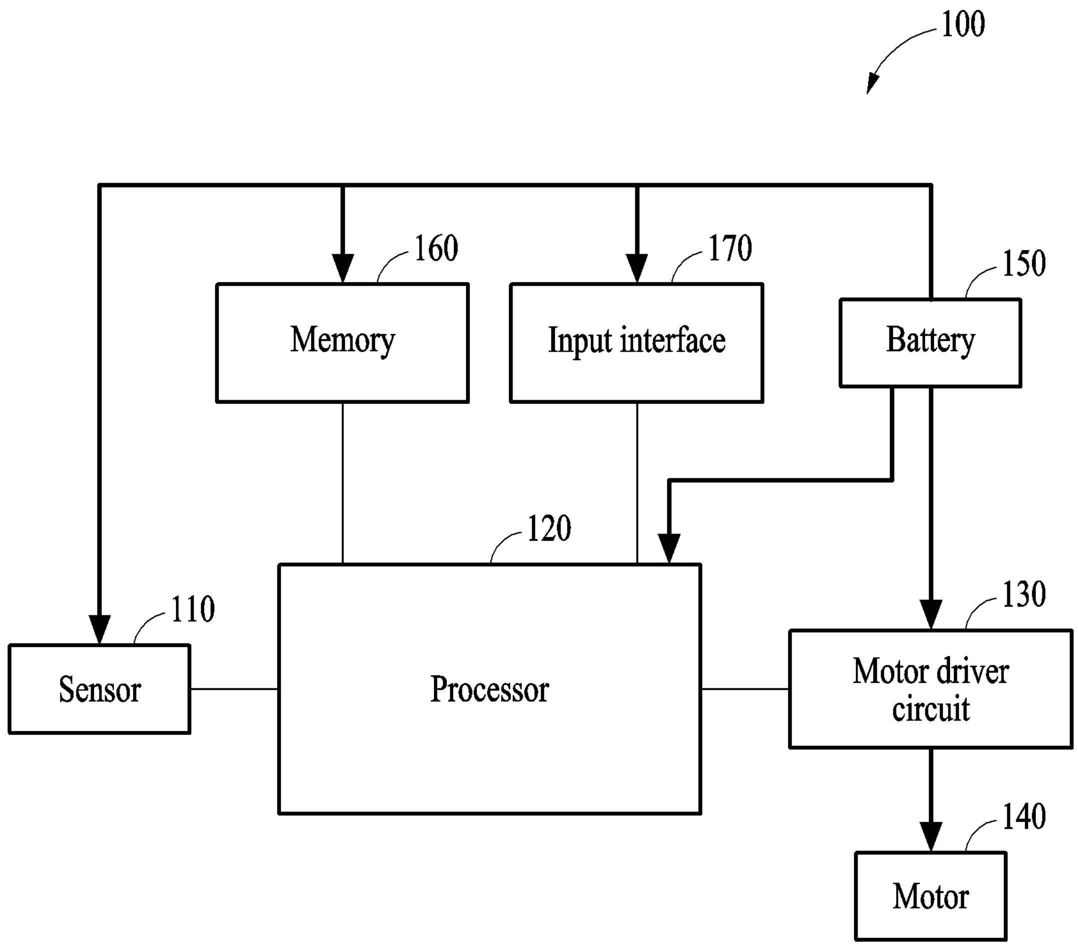
FIGS. 1A through 2 are diagrams illustrating an example of a wearable device according to example embodiments.

Hereinafter, example embodiments are described in detail with reference to the accompanying drawings. However, various alterations and modifications may be made to the example embodiments. Here, the example embodiments are not meant to be limited by the descriptions of the present disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It is further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It is further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like components and a repeated description related thereto are omitted. In the description of example embodiments, detailed description of well-known related structures or functions are omitted when it is deemed that such description will cause ambiguous interpretation of the present disclosure.

Also, in the description of the components, terms such as first, second, A, B, (a), (b) or the like may be used herein when describing components of the example embodiments. These terms are used only for the purpose of discriminating one component from another component, and the nature, the sequences, or the orders of the components are not limited by the terms. When one component is described as being "connected", "coupled", or "joined" to another component, it should be understood that one component can be connected or attached directly to another component, and an intervening component can also be "connected", "coupled", or "joined" to the components.

The same name may be used to describe a component included in one example embodiment and a component having a common function. Unless otherwise mentioned, the descriptions of the example embodiments may be applicable to the following example embodiments, and thus duplicated descriptions are omitted for conciseness.

Figure 1B:
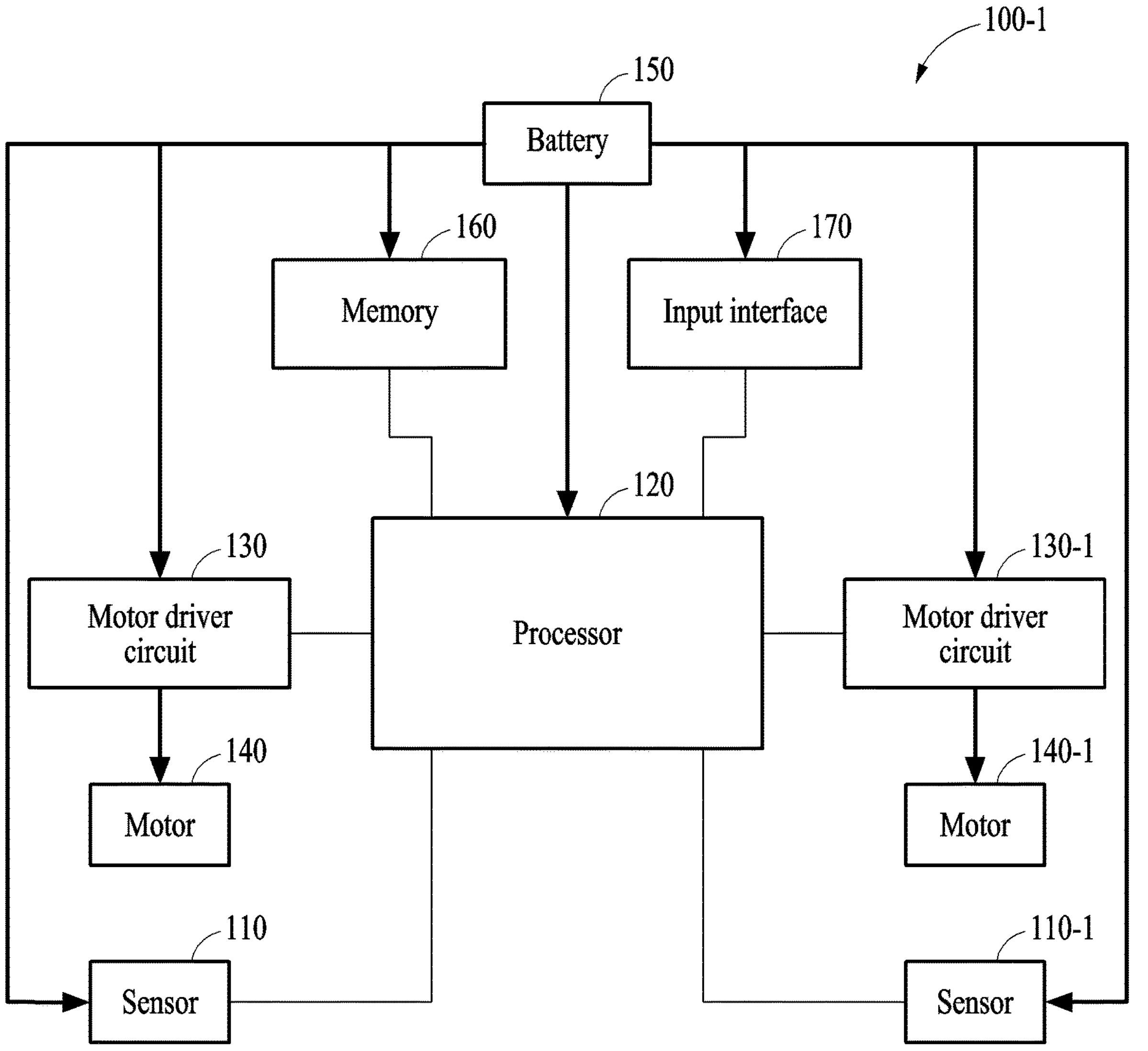
Figure 1C:
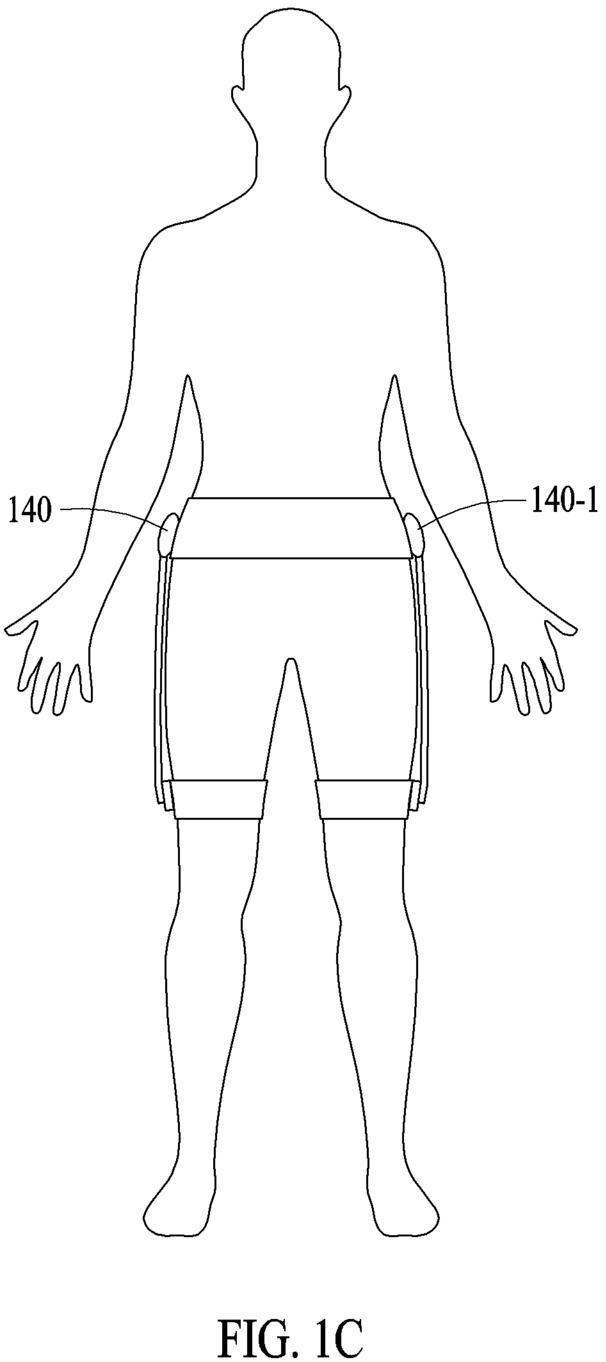
Figure 1D:
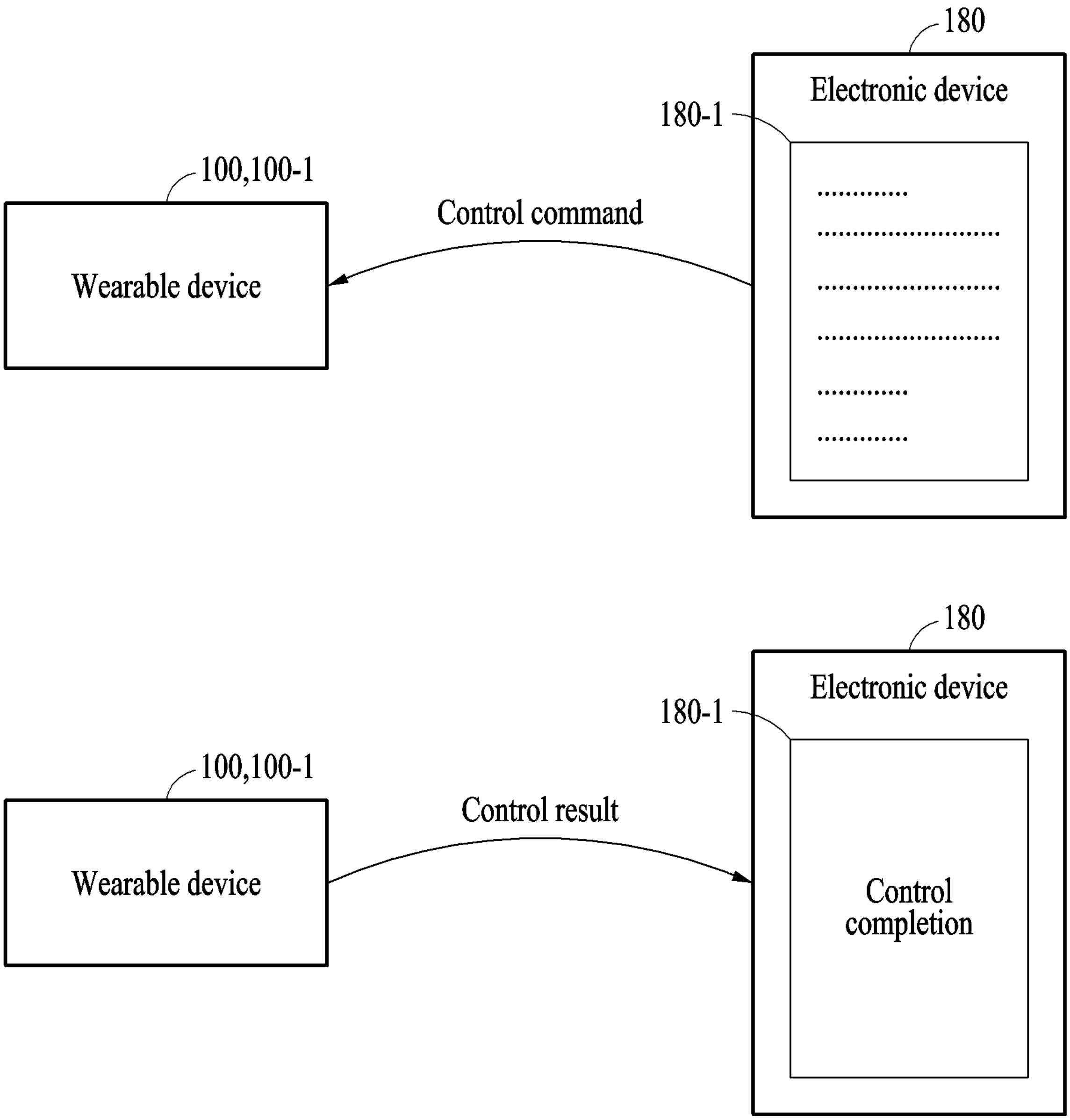
Figure 2:
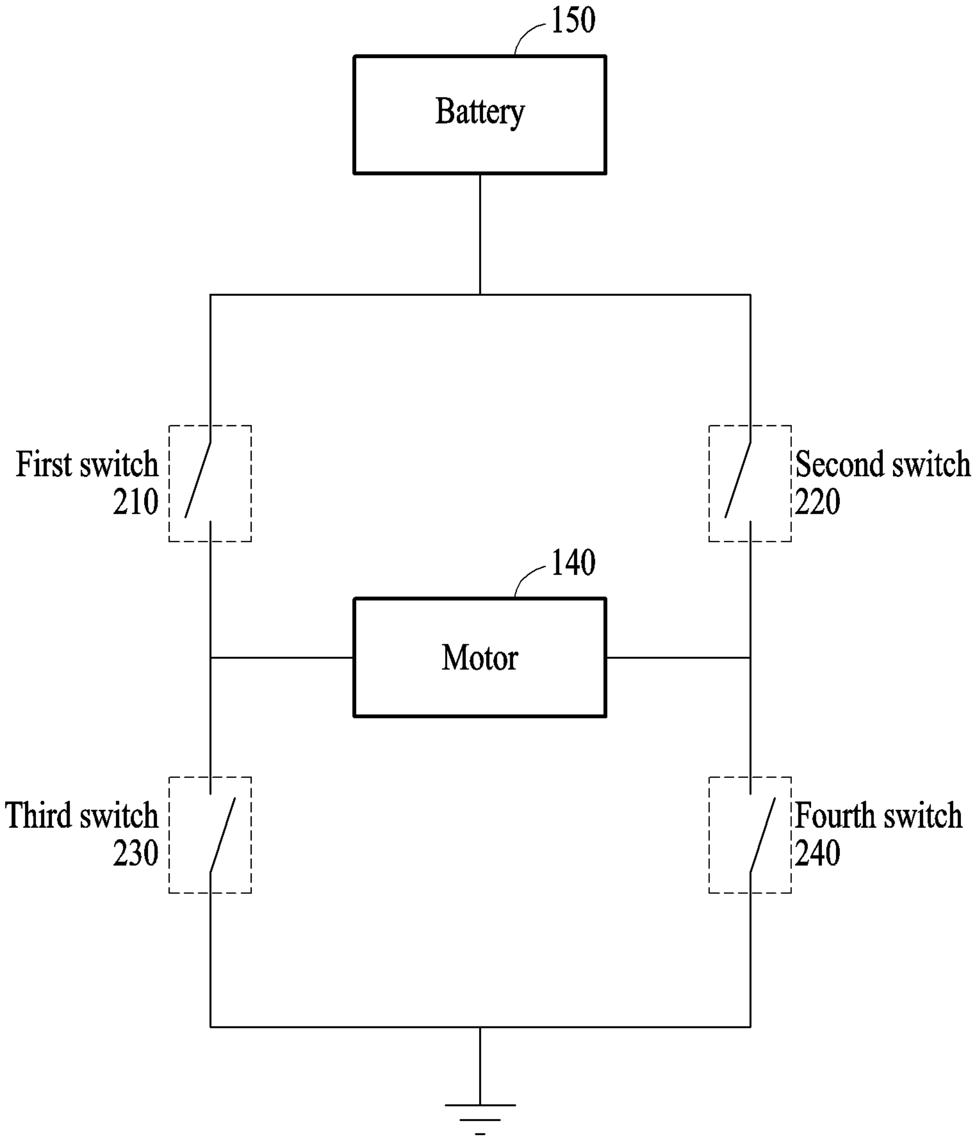

FIGS. 1A through 2 are diagrams illustrating an example of a wearable device according to example embodiments.

A wearable device 100 may be worn on a body (e.g., a leg, an arm, a waist, etc.) of a user to provide a resistance force to a movement (e.g., movement during exercise) of the user. The resistance force may be a force that hinders a movement of the user or provides a resistance to the movement of the user, and may represent a force acting in a direction opposite to a direction in which the user moves. The resistance force may also be referred to as an exercise load. According to some embodiments, the wearable device 100 may provide an assistance force to a movement of the user. The assistance force may be a force to assist a movement of the user, and may represent a force acting in the same direction as a direction in which the user moves.

Referring to FIG. 1A, the wearable device 100 includes a sensor 110, a processor 120, a motor driver circuit 130, a motor 140, a battery 150, a memory 160, and an input interface 170. Although a single sensor 110, a single motor driver circuit 130, and a single motor 140 are illustrated in FIG. 1A, these components are merely examples. For example, as shown in FIG. 1B, a wearable device 100-1 may include a plurality of sensors 110 and 110-1, a plurality of motor driver circuits 130 and 130-1, and a plurality of motors 140 and 140-1. In addition, according to some embodiments, the wearable device 100 may include a plurality of processors. A number of motor driver circuits, a number of motors, or a number of processors may vary depending on a body part on which the wearable device 100 is to be worn. An example in which the wearable device 100-1 is worn on a hip is shown in FIG. 1C. In FIG. 1C, the motors 140 and 140-1 are located around a right hip joint and a left hip joint, respectively. Accordingly, the wearable device 100-1 may provide a resistance force to flexion and extension of each hip joint when a user walks. Here, the flexion may be a forward rotation of a hip joint, and the extension may be a backward rotation of a hip joint. The positioning of the motors shown in FIG. 1C is merely exemplary, and each of the motors 140 and 140-1 may be disposed as desired. For example, each of the motors 140 and 140-1 may be disposed to transmit a resistance force to adduction and abduction of each hip joint. Here, the abduction may indicate a movement away from a body of a user when the user moves laterally, and the adduction may indicate a movement closer to the body. If the user lies on his or her side and lifts a first leg, a hip joint of the first leg may be abducted, and if the first leg is lowered, the hip joint of the first leg may be adducted, which is described in further detail below with reference to FIG. 8B. The motor 140 may be disposed to transmit a resistance force to each of adduction and abduction of the right hip joint.

The following descriptions of the sensor 110, the motor driver circuit 130, and the motor 140 are also applicable to the sensor 110-1, the motor driver circuit 130-1, and the motor 140-1 illustrated in FIG. 1D.

Referring back to FIG. 1A, the sensor 110 may include an encoder. The encoder may detect rotation information, for example, a rotation speed and a rotation position of a shaft. The encoder may include, for example, an absolute encoder. The absolute encoder may transmit a bit value corresponding to each rotation position of the shaft to the processor 120, and the processor 120 may calculate a rotation angle of the shaft based on one or more received bit values. For example, the absolute encoder may transmit a first bit value corresponding to a first rotation position to the processor 120 if a shaft of the absolute encoder is in the first rotation position, and may transmit a second bit value corresponding to a second rotation position to the processor 120 if the shaft is rotated to be in the second rotation position. The processor 120 may calculate a rotation angle of the shaft by subtracting an angle corresponding to the first bit value from an angle corresponding to the second bit value. According to some embodiments, the absolute encoder may calculate the rotation angle of the shaft by subtracting the second rotation position from the first rotation position of the shaft, and transmit the calculated rotation angle to the processor 120.

The encoder is not limited to the absolute encoder described above, and may include, for example, various encoders such as an incremental encoder, a magnetic encoder, or any other encoder known to one of ordinary skill in the art.

The type of the sensor 110 is not limited to the encoder, and the wearable device 100 may further include an acceleration sensor, a gyro sensor, an inertial measurement unit (IMU) sensor, or any other sensor known to one of ordinary skill in the art.

When a user moves, the shaft of the encoder may be rotated by a movement of the user, and accordingly, the rotation angle of the shaft of the encoder may correspond to a joint angle of the user. The rotation angle of the shaft of the encoder in the wearable device 100 may be used as a joint angle of a user. The rotation angle of the shaft of the encoder may be expressed as a joint angle of a user.

The processor 120 may control an overall operation of the wearable device 100.

The processor 120 may control the motor driver circuit 130 based on an operation mode of the wearable device 100. The operation mode of the wearable device 100 may include a first resistance mode in which the motor 140 outputs a resistance force by receiving power from the battery 150, and a second resistance mode in which the motor 140 outputs a resistance force without receiving power from the battery 150.

In the first resistance mode, the processor 120 may control the motor driver circuit 130 such that the motor 140 may receive power from the battery 150, and accordingly, a resistance force stronger than that of the second resistance mode may be output.

In the second resistance mode, the processor 120 may control the motor driver circuit 130 based on a control signal having a duty ratio, which is described in detail with reference to FIG. 7 below. The control signal may be a pulse width modulation (PWM) signal in which a high value and a low value are repeated. If a single period of the PWM signal is denoted by T, and if an amount of time during which a high value is maintained in a single period is denoted by $t_H$, the duty ratio may be denoted by $t_H/T$. A control state of the motor driver circuit 130 may be switched between a first control state and a second control state according to a duty ratio of a PWM signal provided to the motor driver circuit 130. In the first control state, terminals (e.g., a positive (+) terminal and a negative (−) terminal) of the motor 140 may be in an equipotential state. Here, the equipotential state may indicate that a potential (or voltage) of the + terminal and a potential (or voltage) of the − terminal in the motor 140 are equal to each other. In the second control state, the terminals of the motor 140 may be electrically opened. In the second resistance mode, when a user moves, the motor 140 may be rotated by a movement of the user, and an electromotive force may be generated in the motor 140 by the rotation of the motor 140. However, in the second resistance mode, a rotation resistance for offsetting an electromotive force may be generated in the motor 140. The above rotation resistance may be provided as a resistance force to a user. For example, in the second resistance mode, the motor 140 may generate a resistance force to be provided to the user, due to the rotation resistance. In the second resistance mode, the motor 140 may output the resistance force even though power is not received from the battery 150.

The motor driver circuit 130 may control an operation of the motor 140 under the control of the processor 120. For example, the motor driver circuit 130 may form an electrical path so that power may be supplied from the battery 150 to the motor 140 under the control of the processor 120. In addition, the motor driver circuit 130 may block an electrical connection between the battery 150 and the motor 140 under the control of the processor 120. An example of the motor driver circuit 130 is shown in FIG. 2. The motor driver circuit 130 illustrated in FIG. 2 may be an H-bridge circuit and include a plurality of switches 210 through 240. When a first switch 210 and a fourth switch 240 are turned on while a second switch 220 and a third switch 230 are turned off under the control of the processor 120, an electrical connection may be established between the battery 150 and ground, thereby enabling power to be supplied from the battery 150 to the motor 140. When the first switch 210 and the second switch 220 are turned off under the control of the processor 120, the electrical connection between the battery 150 and the motor 140 may be blocked.

The battery 150 may supply power to components of the wearable device 100, for example, the sensor 110 and the processor 120. Thick arrows shown in FIGS. 1A and 1B indicate that the battery 150 may supply power to components of the wearable devices 100 and 100-1. For example, a circuit (e.g., a power management integrated circuit (PMIC)) configured to convert power of the battery 150 to match an operating voltage of each of the components of the wearable device 100 and provide the power to the components of the wearable device 100 may be provided. In addition, the battery 150 may or may not supply power to the motor 140 based on the operation mode of the wearable device 100. For example, the battery 150 may supply power to the motor 140 in the first resistance mode, and may not supply power to the motor 140 in the second resistance mode. Accordingly, less power may be consumed in the battery 150 in the second resistance mode, and thus, an available time for using the wearable device 100 may increase.

When a user is moving while wearing the wearable device 100 or 100-1 in the second resistance mode, the processor 120 may obtain a joint angle of the user using the sensor 120. Based on a determination that a difference between the reference angle and the obtained joint angle is greater than or equal to a set value (e.g., predetermined value), the processor 120 may increase the duty ratio when a difference between a reference angle and the obtained joint angle increases. The processor 120 may provide a control signal of the increased duty ratio to the motor driver circuit 130 to control operations of switches included in the motor driver circuit 130. When the difference between the reference angle and the joint angle increases due to an increase in a movement of the user, the motor 140 may output a resistance force with a higher intensity corresponding to the increased movement, which is described in further detail with reference to FIGS. 8A through 10B.

According to some embodiments, the wearable device 100 or 100-1 may provide a support force to a user. When the difference between the reference angle and the joint angle increases in a negative direction in a state in which the difference between the reference angle and the joint angle is less than or equal to the set value, the processor 120 may increase the duty ratio. The processor 120 may control the motor driver circuit 130 based on a control signal of the increased duty ratio. The difference between the reference angle and the joint angle may increase in the negative direction due to an increase in the movement of the user, and accordingly, the motor 140 may output a support force with a higher intensity corresponding to the increased movement, which is described in further detail below with reference to FIGS. 11A and 11B.

The memory 160 may store software and data required for an operation of the wearable device 100 or 100-1. The memory 160 may include, but is not limited to, for example, a non-volatile memory, a volatile memory, a flash memory, or any other memory known to one of ordinary skill in the art. The memory 160 may store resistance force generation setting information indicating a difference between the reference angle and each of joint angles and a corresponding relationship between respective duty ratios, which is described in further detail below.

The input interface 170 may receive an input to control the wearable device 100 or 100-1 from a user. The input interface 170 may include, but is not limited to, for example, a physical button, a keypad, a jog wheel, a microphone, or any other input interface known to one of ordinary skill in the art.

Additionally, the wearable device 100 or 100-1 may further include a display and a communication circuit.

The display may display state information of the wearable device 100 or 100-1. For example, the display may display information on a charging capacity of the battery 150 and a resistance mode in which the wearable device 100 or 100-1 operates. In addition, the display may display information for controlling the operation of the wearable device 100 or 100-1. For example, the display may display a user interface (UI) for receiving an input to select the first resistance mode or the second resistance mode from a user. The processor 120 may allow the wearable device 100 to operate in the first resistance mode when the user selects the first resistance mode through the UI, and allow the wearable device 100 to operate in the second resistance mode when the user selects the second resistance mode through the UI.

The communication circuit may include various communication circuits such as a short-range wireless communication circuit, a wireless local area network (LAN) communication circuit, a mobile communication circuit, or any other communication circuit known to one of ordinary skill in the art. The short-range wireless communication circuit may communicate with an electronic device (e.g., a mobile phone, a smartwatch, a tablet personal computer (PC), etc.) arranged in a short distance according to a short-range wireless communication scheme (e.g., near field communication (NFC), Bluetooth, ZigBee, etc.). The wireless LAN communication circuit may communicate with a server by accessing a network according to a wireless LAN communication scheme (e.g., wireless fidelity (Wi-Fi), etc.). The mobile communication circuit may communicate with a server by accessing a mobile communication network according to a mobile communication scheme (e.g., 3G, 4G, 5G, etc.).

Referring to FIG. 1D, the wearable device 100 may communicate with an electronic device 180. For example, the electronic device 180 may be an electronic device associated with a user of the wearable device 100. For example, a user wearing the wearable device 100 may exercise together with a trainer. In this example, the electronic device 180 may correspond to an electronic device associated with the trainer.

The wearable device 100 may communicate with the electronic device 180 based on the short-range wireless communication scheme. According to some embodiments, the wearable device 100 and the electronic device 180 may communicate with each other via a server using the short-range wireless communication scheme or the mobile communication scheme.

The electronic device 180 may display a UI for controlling an operation of the wearable device 100 on a display 180-1. The UI may be, for example, a first soft key for allowing the wearable device 100 to operate in the first resistance mode, a second soft key for allowing the wearable device 100 to operate in the second resistance mode, a third soft key for changing a set value, and any other soft key known to one of ordinary skill in the art.

As illustrated in FIG. 1D, the user (or the trainer) may input a control command to control an operation of the wearable device 100 through the UI on the display 180-1 of the electronic device 180, and the electronic device 180 may transmit the control command to the wearable device 100. The wearable device 100 may operate according to the received control command, and transmit a control result to the electronic device 180. The electronic device 180 may display a control completion message on the display 180-1 of the electronic device 180.

For example, the user (or the trainer) may input a control command to control the wearable device 100 to operate in the first resistance mode by selecting the above-described first soft key, and the electronic device 180 may transmit the control command to the wearable device 100. The wearable device 100 may operate in the first resistance mode according to the received control command, and may transmit a control result indicating that the wearable device 100 is operating in the first resistance mode to the electronic device 180. The electronic device 180 may display a message indicating that the wearable device 100 is operating in the first resistance mode on the display 180-1.

Figure 3:
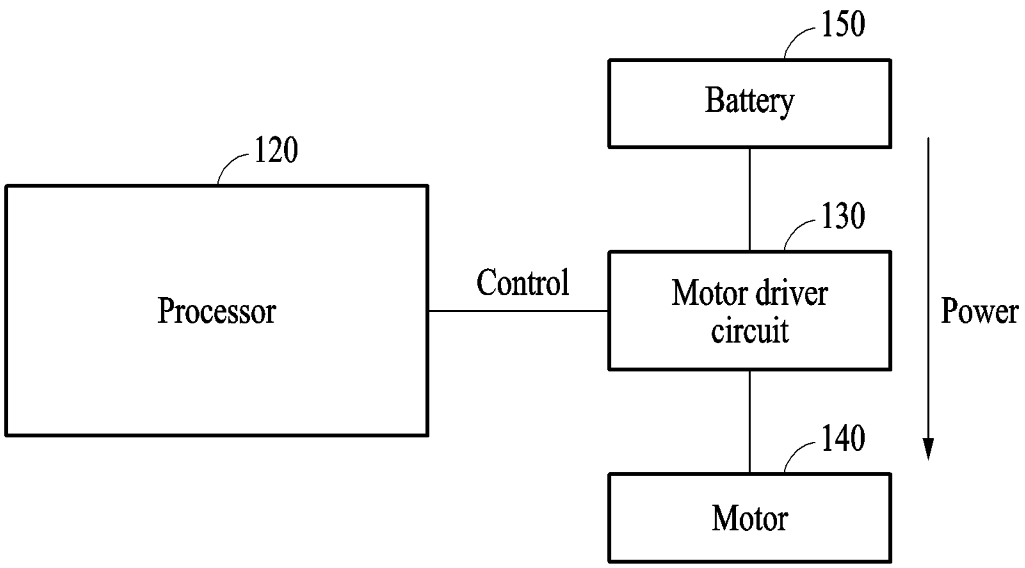
FIGS. 3 through 5 are diagrams illustrating a first resistance mode of a wearable device according to example embodiments.
Figure 4:
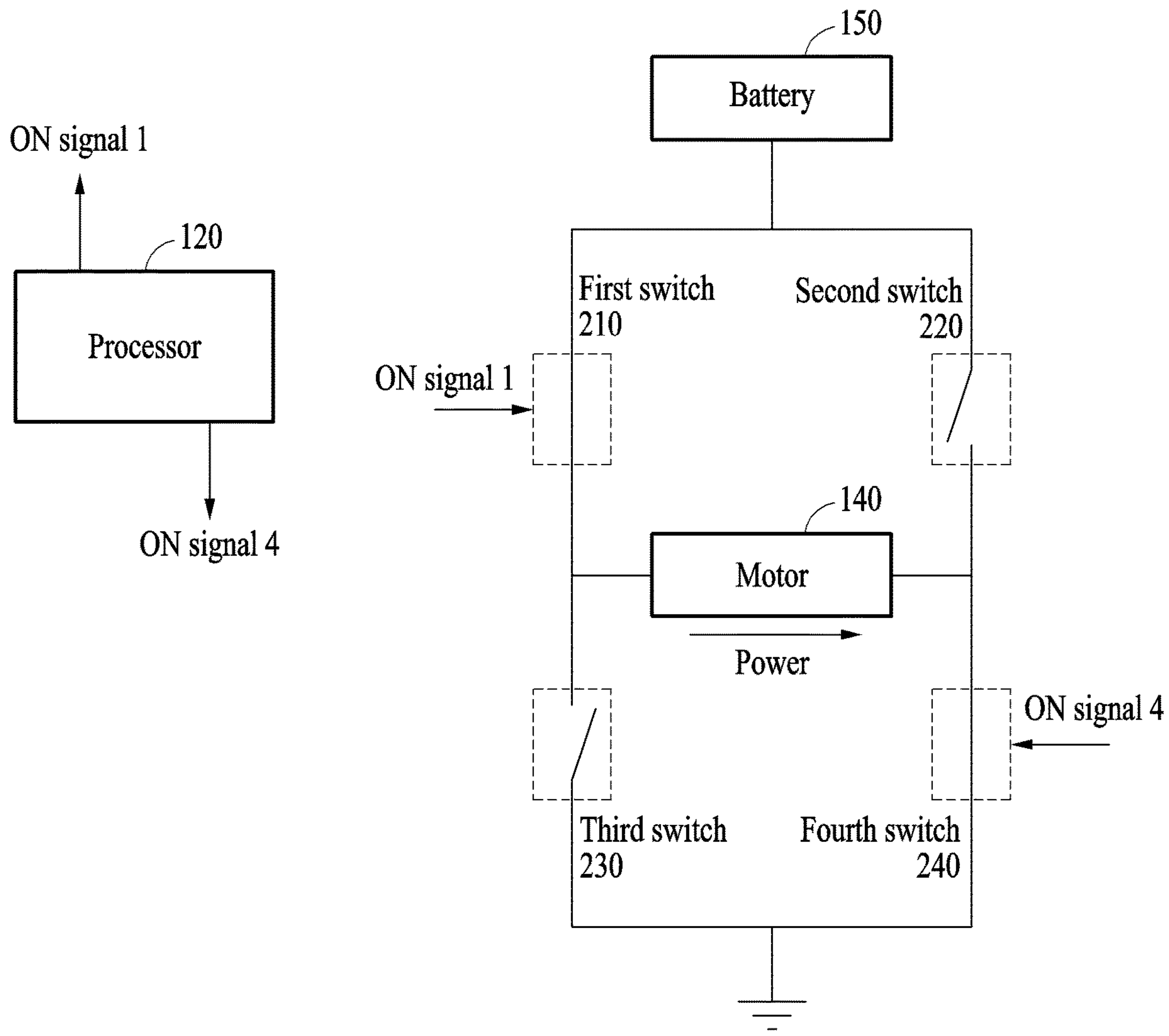
Figure 5:
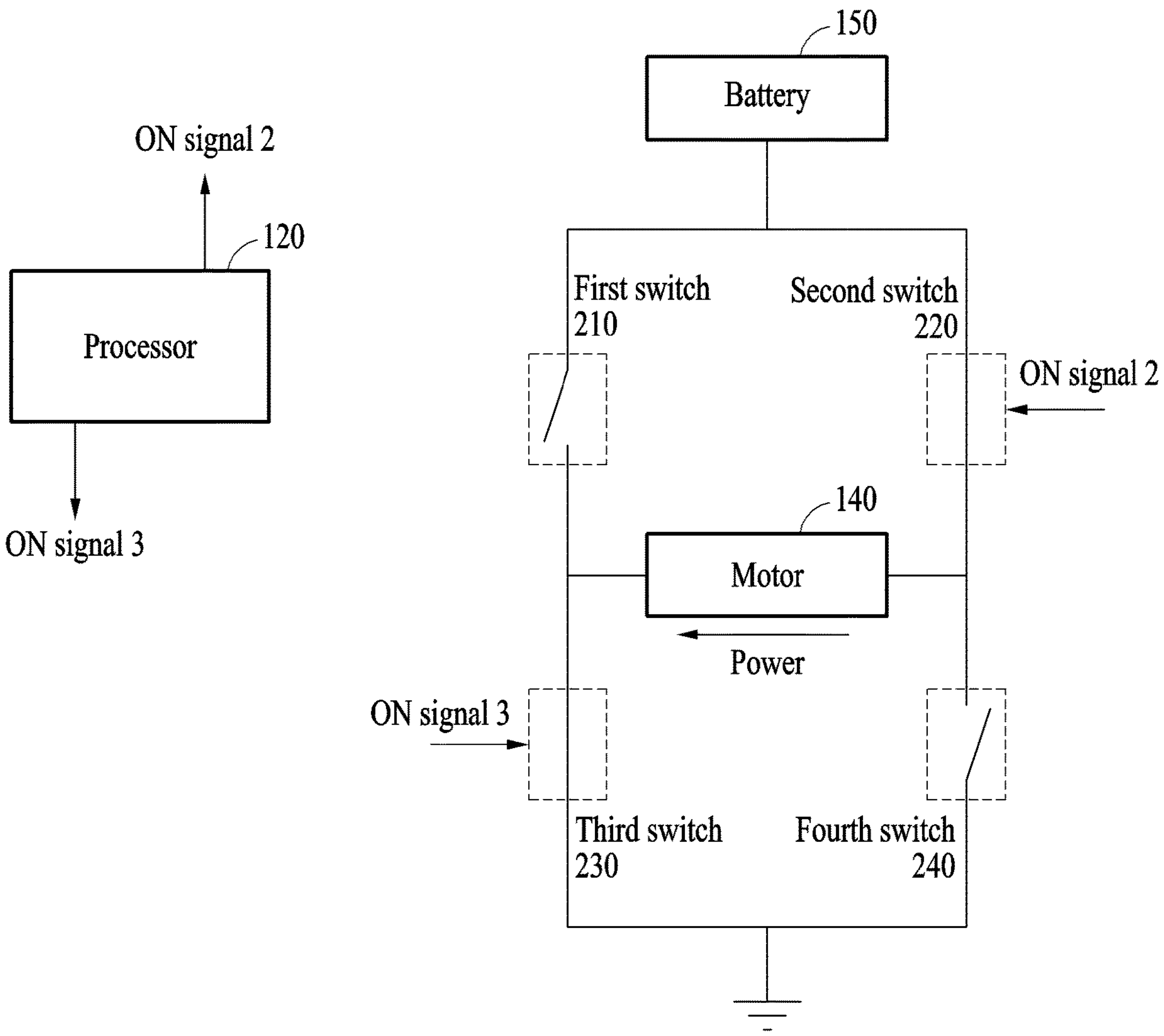

FIGS. 3 through 5 are diagrams illustrating a first resistance mode of a wearable device according to example embodiments.

The wearable device 100 may operate in the first resistance mode. In an example, a user may select the first resistance mode as the operation mode of the wearable device 100 through the input interface 170 of the wearable device 100 or the UI on the display of the wearable device 100 so that the wearable device 100 may operate in the first resistance mode. In another example, the wearable device 100 may receive a control command to operate in the first resistance mode from the electronic device 180 and may operate in the first resistance mode according to the received control command. According to some embodiments, the first resistance mode may be a basic resistance mode of the wearable device 100.

Referring to FIG. 3, in the first resistance mode, the processor 120 may control the motor driver circuit 130 such that power may be supplied from the battery 150 to the motor 140. In an example, as illustrated in FIG. 4, the processor 120 may apply an ON signal 1 to the first switch 210 and apply an ON signal 4 to the fourth switch 240. The processor 120 may independently output the ON signals 1 and 4, as described above. The signals are merely an example of operating the switches. In another example, the processor 120 may output an ON signal, the output ON signal may be split by a separate circuit, and signals obtained by splitting the ON signal may be applied to the first switch 210 and the fourth switch 240, respectively. The first switch 210 and the fourth switch 240 may be turned on by a control signal output from the processor 120. Since an ON signal is not applied to each of the second switch 220 and the third switch 230, the second switch 220 and the third switch 230 may be turned off. According to some embodiments, the processor 120 may apply an OFF signal to the second switch 220 and the third switch 230, to turn off the second switch 220 and the third switch 230. The motor 140 may be rotated in a forward direction in response to power being supplied from the battery 150 to output a resistance force. Here, the forward direction may indicate that the motor 140 rotates in a clockwise direction.

The motor 140 may rotate in a backward direction in addition to the forward direction, to output a resistance force. The backward direction may indicate that the motor 140 rotates in a counterclockwise direction. In an example shown in FIG. 5, the processor 120 may apply an ON signal 2 to the second switch 220 and apply an ON signal 3 to the third switch 230. The processor 120 may independently output the ON signals 2 and 3, as described above, which is merely an example of operating the switches. In another example, the processor 120 may output an ON signal, the output ON signal may be split by a separate circuit, and signals obtained by splitting the ON signal may be applied to the second switch 220 and the third switch 230, respectively. The second switch 220 and the third switch 230 may be turned on under the control of the processor 120. Since an ON signal is not applied to each of the first switch 210 and the fourth switch 240, the first switch 210 and the fourth switch 240 may be turned off. According to some embodiments, the processor 120 may apply an OFF signal to the first switch 210 and the fourth switch 240, to turn off the first switch 210 and the fourth switch 240. The motor 140 may be rotated in the backward direction in response to power being supplied from the battery 150, to output a resistance force.

In the first resistance mode, the motor 140 may output a resistance force by receiving power from the battery 150, and thus, a resistance force greater than that in the second resistance mode may be output.

Figure 6:
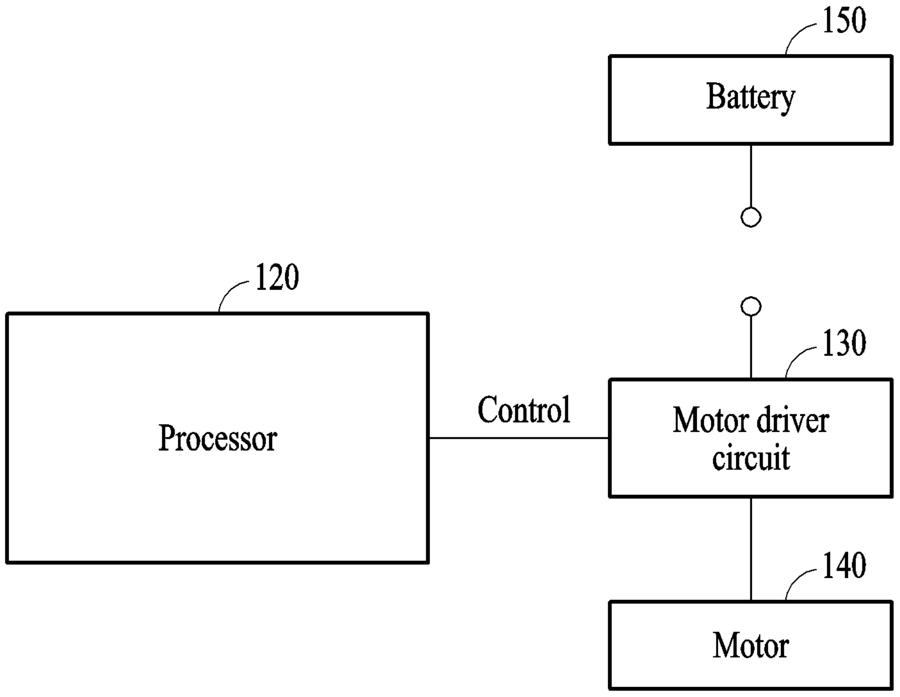
FIGS. 6 and 7 are diagrams illustrating a second resistance mode of a wearable device according to example embodiments.
Figure 7:
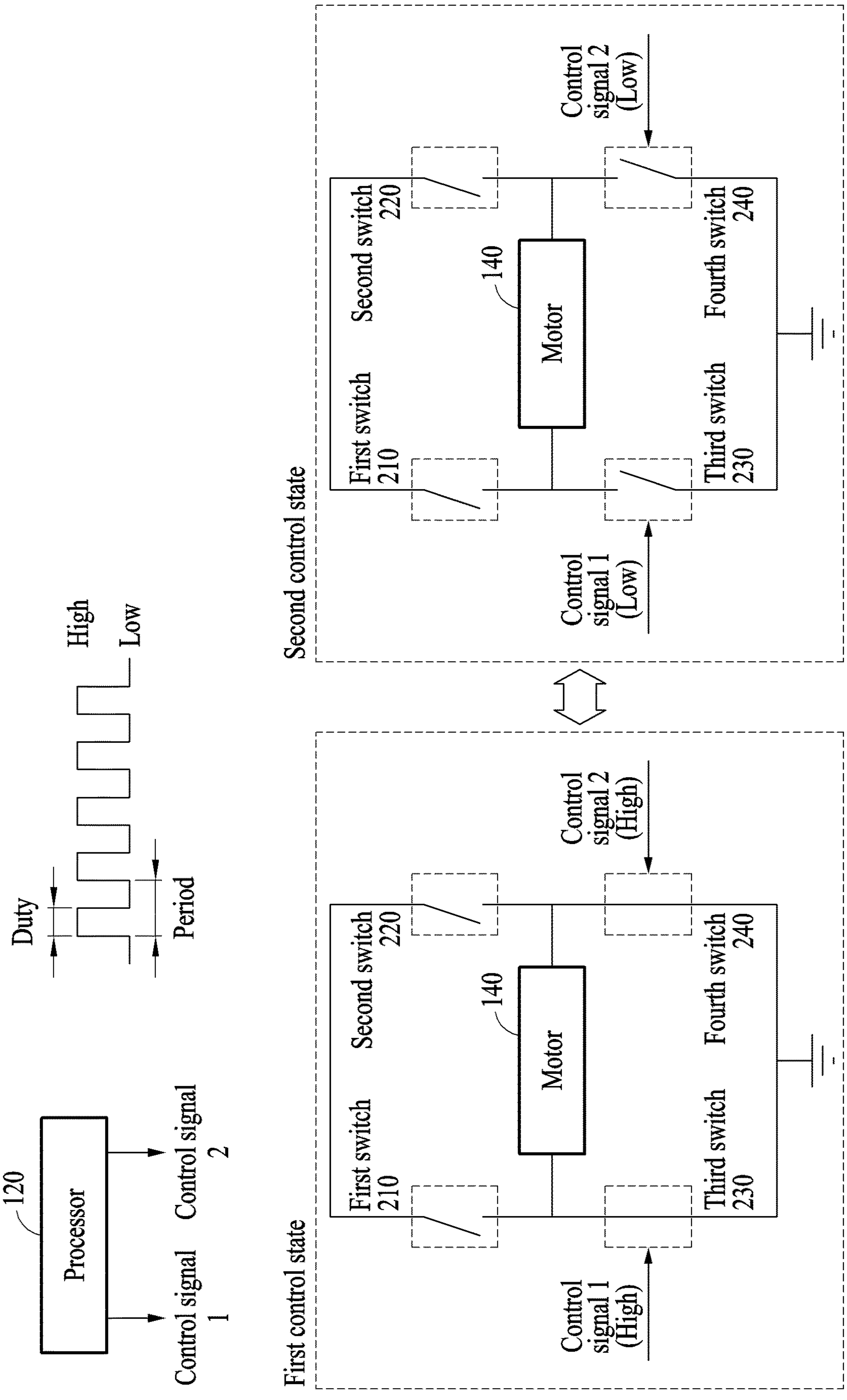

FIGS. 6 and 7 are diagrams illustrating a second resistance mode of a wearable device according to example embodiments.

The wearable device 100 may operate in the second resistance mode. In an example, a user may select the second resistance mode as the operation mode of the wearable device 100 through the input interface 170 of the wearable device 100 or the UI on the display of the wearable device 100, so that the wearable device 100 may operate in the second resistance mode. In another example, the wearable device 100 may receive a control command to operate in the second resistance mode from the electronic device 180 and may operate in the second resistance mode according to the received control command. In another example, when the charging capacity of the battery 150 is less than a predetermined value, the processor 120 may perform switching from the first resistance mode to the second resistance mode to minimize power use of the battery 150. According to some embodiments, the second resistance mode may be a basic mode of the wearable device 100.

Referring to FIG. 6, in the second resistance mode, the processor 120 may control the control state of the motor driver circuit 130 to be switched between the first control state and the second control state. The second resistance mode is described in further detail with reference to FIG. 7.

Referring to FIG. 7, the processor 120 may turn off the first switch 210 and the second switch 220 to block the electrical connection between the battery 150 and the motor 140. In the second resistance mode, the first switch 210 and the second switch 220 may remain in a state of being turned off.

The processor 120 may apply a control signal 1 to the third switch 230 and apply a control signal 2 to the fourth switch 240, such that the control state of the motor driver circuit 130 may be switched between the first control state and the second control state. The control signals 1 and 2 may have a duty ratio in a form of a PWM signal in which a high value and a low value are repeated in accordance with a period. As described above, the duty ratio may be $t_H/T$ when a single period is denoted by T and an amount of time during which a high value is maintained in a single period is denoted by $t_H$. The processor 120 may independently output the control signals 1 and 2, as described above. The control signals are merely an example of operating the switches. In another example, the processor 120 may output a single control signal, the output control signal may be split by a separate circuit, and signals obtained by splitting the control signal may be applied to the third switch 230 and the fourth switch 240, respectively.

When the control signals 1 and 2 are high values, the + terminal and the – terminal of the motor 140 may be connected to each other to be in the equipotential state. For example, in the first control state, the + terminal and the – terminal of the motor 140 may be electrically connected to each other to have the same potential (or voltage).

In the first control state, the motor 140 may form a closed loop with the ground without an electrical connection with the battery 150. Thus, the first control state may also be referred to as a closed loop state of the motor 140 free of the electrical connection with the battery 150.

When a user moves in the first control state, the motor 140 around a joint of the user may rotate by a movement of the joint of the user. By such a rotation, an electromotive force (or a potential difference) may be generated in the motor 140. Since the terminals of the motor 140 in the first control state are in the equipotential state, a rotation resistance may be generated in the motor 140 to reduce the generated electromotive force. The above rotation resistance may be provided as a resistance force to the user.

When the control signals 1 and 2 are low values, the + terminal and the – terminal of the motor 140 may be electrically opened. Since there is no electrical connection to the motor 140 in the second control state, the second control state may also be referred to as an open loop state of the motor 140.

When the user moves in the second control state, the motor 140 may be rotated by the movement of the user. Since the + terminal and the – terminal of the motor 140 are electrically opened in the second control state, the above-described electromotive force may not be generated in the motor 140, and a resistance force may not be output.

Since the high values and the low values of the control signals 1 and 2 are repeated, the control state of the motor driver circuit 130 may be repeatedly switched between the first control state and the second control state.

The processor 120 may adjust a magnitude of the resistance force by controlling a duty ratio of each of the control signals 1 and 2. When a time for which a high value is maintained increases in a period of each of the control signals 1 and 2, a ratio of the motor 140 operating in the first control state in a period of each of control signals 1 and 2 may increase compared to a ratio of the motor 140 operating in the second control state in a period of each of control signals 1 and 2. Thus, an intensity of the resistance force to be output to the user may increase.

In the second resistance mode, the wearable device 100 may output a resistance force without a power supply from the battery 150 to the motor 140, and thus, less power of the battery 150 may be consumed and an available time for using the wearable device 100 may increase. In addition, when the power of the battery 150 is supplied to the motor 140, the motor 140 may malfunction. However, since in the second resistance mode, the power of the battery 150 is not supplied to the motor 140, a potential malfunction of the motor 140 may be prevented, resulting in enhanced safety of the wearable device 100.

FIGS. 8A through 11B are diagrams illustrating examples of operations of a wearable device in the second resistance mode according to example embodiments.

Figure 8A:
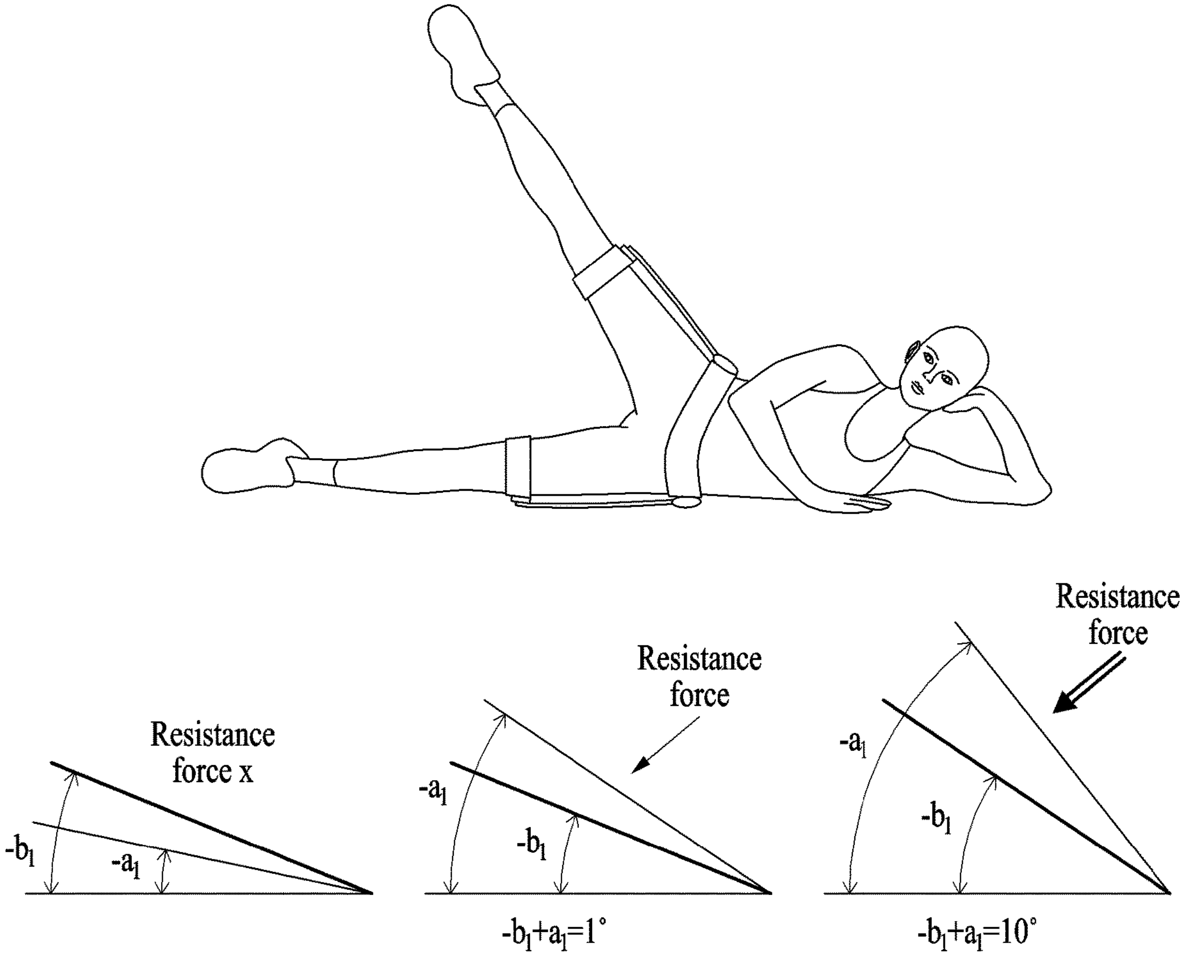
FIGS. 8A through 10B are diagrams illustrating examples of operations of a wearable device in a second resistance mode according to example embodiments.

In an example shown in FIG. 8A, a user may be wearing the wearable device 100-1 described with reference to FIG. 1B on lower extremities and performs an exercise of repeating abduction of lifting a first leg and adduction of lowering the first leg. The motor 140 may be disposed such that a resistance force may be output to each of the abduction and the adduction. The exercise illustrated in FIG. 8A is directed towards obtaining an effect of strength training since a resistance force output from the wearable device 100-1 increases if the user lifts the first leg at an angle greater than or equal to a reference angle. To generate a resistance force suitable for the purpose of exercising, resistance force generation setting information (e.g., Table 1 shown below, or a relational expression corresponding to a graph shown in FIG. 8B) may be stored in the memory 160 of the wearable device 100-1. Alternatively, the wearable device 100-1 may receive resistance force generation setting information from an external device (e.g., a server or the electronic device 180-1) through a communication module, and may store the resistance force generation setting information in the memory 160.

TABLE 1

| Difference between reference angle −b1 and first hip joint angle −a1 | Duty ratio |
|---|---|
| 1° | 0.7 |
| . . . | . . . |
| 10° | 0.8 |
| . . . | . . . |
| $\theta_{motion1}$ | Maximum duty ratio |

Figure 8B:
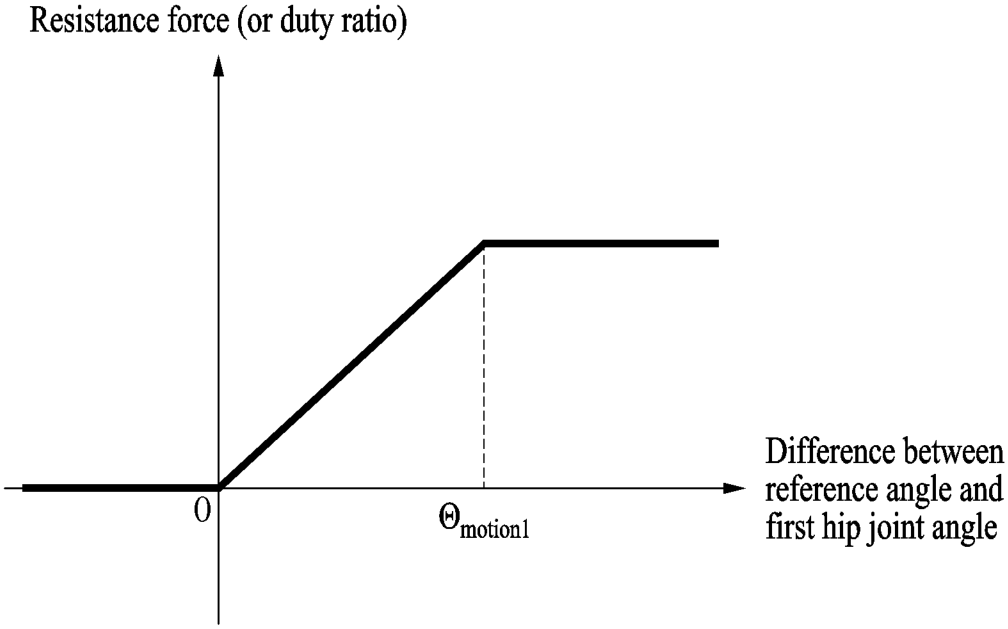

Table 1 and the relational expression corresponding to the graph shown in FIG. 8B are merely examples for explaining the resistance force generation setting information for the exercise of FIG. 8A. As understood by one of ordinary skill in the art, the resistance force generation setting information for the exercise of FIG. 8A is not limited to Table 1 and the relational expression corresponding to the graph shown in FIG. 8B.

Before the user exercises, the motor driver circuit 130 may be in the second control state.

When the user exercises, the processor 120 may obtain a first hip joint angle (−a1) of the user using the sensor 110. For example, the sensor 110, which is an encoder, may transmit a first bit value corresponding to a first position of a shaft to the processor 120 before the user moves. When the user moves, the shaft of the encoder may rotate, and the sensor 110 may transmit a second bit value corresponding to a second position changed by the rotation of the shaft to the processor 120. The processor 120 may obtain a difference between an angle corresponding to the second bit value and an angle corresponding to the first bit value as the first hip joint angle (−a1). According to some embodiments, the sensor 110 may calculate a difference between an angle corresponding to the second position and an angle corresponding to the first position, and may transmit the calculated difference to the processor 120. The processor 120 may receive the difference between the angle corresponding to the second position and the angle corresponding to the first position from the sensor 110 to obtain the first hip joint angle (a1). In the example shown in FIG. 8A, the first hip joint angle obtained when the user lifts the first leg may be a negative number. As understood by one of ordinary skill in the art, the negative number is merely an example, and the first hip joint angle obtained when the user lifts the first leg may be a positive number.

The symbol −a1 is for notation of the first hip joint angle.

The processor 120 may calculate a difference "−b1+a1" between the reference angle −b1 and the first hip joint angle −a1.

If "−b1+a1" is less than a set value of "0" based on the resistance force generation setting information, the processor 120 may maintain the second control state of the motor 140.

If "−b1+a1" is 1° exceeding the set value of "0", the processor 120 may obtain a duty ratio of "0.7" corresponding to 1° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7". By performing the switching repeatedly, the motor 140 may output a resistance force.

When "−b1+a1" increases as the user lifts the first leg higher, the processor 120 may increase (or change) the duty ratio based on the resistance force generation setting information, and may apply control signals 1 and 2 with the increased (or changed) duty ratio to the third switch 230 and the fourth switch 240, respectively. Due to an increase in the duty ratio, the motor 140 may be in the first control state for a relatively long time within one period, to output a resistance force with a higher intensity.

For example, when "−b1+a1" becomes 10°, the processor 120 may obtain a duty ratio of "0.8" corresponding to 10° based on the resistance force generation setting information, and may apply the control signals 1 and 2 with the duty ratio of "0.8" to the third switch 230 and the fourth switch 240 of the motor driver circuit 130, respectively. The control state of the motor driver circuit 130 may be repeatedly switched between the first control state and the second control state according to the duty ratio of "0.8". By performing the switching repeatedly, the motor 140 may output a resistance force. The motor driver circuit 130 may be in the first control state for a relatively long time within one period when the duty ratio is "0.8", in comparison to when the duty ratio is "0.7". Thus, the motor 140 may output a resistance force with a higher intensity when the duty ratio is "0.8", in comparison to when the duty ratio is "0.7".

If "−b1+a1" is greater than or equal to $\theta_{motion1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second state according to the maximum duty ratio, and accordingly, the motor 140 may output a resistance force with a maximum intensity.

For example, when the user lowers the first leg in a situation in which the resistance force is output to the first leg, "−b1+a1" may decrease. In this example, the processor 120 may reduce the duty ratio based on the resistance force generation setting information and apply control signals 1 and 2 with the reduced duty ratio to the third switch 230 and the fourth switch 240, respectively. If the user lowers the first leg, the duty ratio may decrease. Thus, the motor 140 may output a resistance force with a relatively low intensity.

If "−b1+a1" is less than the set value of "0", the processor 120 may not apply any signal to the third switch 230 and the fourth switch 240 such that the third switch 230 and the fourth switch 240 may be turned off. Accordingly, the motor driver circuit 130 may be in the second control state, and a resistance force may not be output from the motor 140.

Unlike the examples described with reference to FIGS. 8A and 8B, a first hip joint angle a1 of the user may be a positive number.

Before the user exercises, the motor driver circuit 130 may be in the second control state.

The processor 120 may calculate a difference "b1−a1" between a reference angle b1 and the first hip joint angle a1.

When "b1−a1" exceeds the set value of "0", the processor 120 may maintain the second control state of the motor driver circuit 130 based on resistance force generation setting information (e.g., Table 2 shown below, or a relational expression corresponding to a graph shown in FIG. 8C) stored in the memory 160.

TABLE 2

| Difference between reference angle b1 and first hip joint angle a1 | Duty ratio |
|---|---|
| −1° | 0.7 |
| . . . | . . . |
| −10° | 0.8 |
| . . . | . . . |
| $-\theta_{motion1}$ | Maximum duty ratio |

Figure 8C:
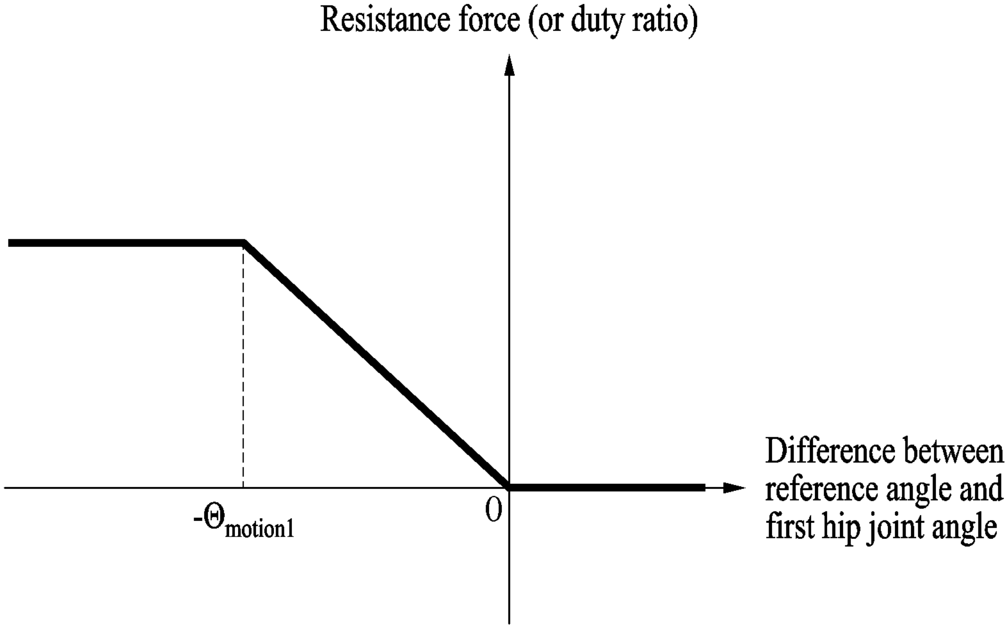

Table 2 and the relational expression corresponding to the graph shown in FIG. 8C are merely examples for explaining the resistance force generation setting information for the exercise of FIG. 8A. As understood by one of ordinary skill in the art, the resistance force generation setting information is not limited to Table 2 and the relational expression corresponding to the graph shown in FIG. 8C.

If "b1−a1" is −1° that is less than the set value of "0", the processor 120 may obtain a duty ratio of "0.7" corresponding to −1° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When "b1−a1" increases in a negative direction as the user lifts the first leg higher, the processor 120 may increase a duty ratio based on the resistance force generation setting information and may apply control signals 1 and 2 with the increased duty ratio to the third switch 230 and the fourth switch 240, respectively.

If "b1−a1" is less than or equal to $-\theta_{motion1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second state according to the maximum duty ratio, and accordingly, the motor 140 may output a resistance force with a maximum intensity.

When "b1−a1" exceeds the set value of "0", the processor 120 may not apply any signal to the third switch 230 and the fourth switch 240 so that the third switch 230 and the fourth switch 240 may be turned off. Accordingly, the motor driver circuit 130 may be in the second control state, and a resistance force may not be output from the motor 140.

In example embodiments, the processor 120 may allow a resistance force to be output based on the first hip joint angle −a1. More specifically, the memory 160 may store resistance force generation setting information (e.g., Table 3 shown below, or a relational expression corresponding to Table 3) for generating a resistance force according to the first hip joint angle −a1 increased to be greater than or equal to a predetermined angle.

TABLE 3

| First hip joint angle −a1 | Duty ratio |
|---|---|
| −5° | 0.7 |
| . . . | . . . |
| −10° | 0.8 |
| . . . | . . . |
| $-\theta_{motion1\_1}$ | Maximum duty ratio |

When the first hip joint angle −a1 is greater than −5° (for example, when the first hip joint angle −a1 is −3°) even though the user lifts the first leg, the processor 120 may not apply any signal to each of the third switch 230 and the fourth switch 240 of the motor driver circuit 130 such that a resistance force may not be generated based on the resistance force generation setting information.

When the first hip joint angle −a1 is −5°, the processor 120 may obtain a duty ratio of "0.7" corresponding to −5° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When the first hip joint angle −a1 increases in the negative direction, the processor 120 may increase the duty ratio based on the resistance force generation setting information and may apply control signals 1 and 2 with the increased duty ratio to the third switch 230 and the fourth switch 240, respectively. Accordingly, the duty ratio may increase, as the user lifts the first leg higher. Thus, the motor 140 may output a resistance force with a higher intensity.

When the first hip joint angle −a1 is less than or equal to $-\theta_{motion1\_1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

When the user lowers the first leg in a situation in which the resistance force is output to the first leg, the first hip joint angle −a1 may decrease. In this example, the processor 120 may reduce the duty ratio based on the resistance force generation setting information and apply control signals 1 and 2 with the reduced duty ratio to the third switch 230 and the fourth switch 240, respectively. If the user lowers the first leg, the duty ratio may decrease. Thus, the motor 140 may output a resistance force with a lower intensity.

The first hip joint angle a1 may be a positive number. The memory 160 may store resistance force generation setting information (e.g., Table 4 shown below, or a relational expression corresponding to Table 4) for generating a resistance force according to the first hip joint angle a1 increased to be greater than or equal to a predetermined angle.

TABLE 4

| First hip joint angle a1 | Duty ratio |
|---|---|
| −5° | 0.7 |
| . . . | . . . |
| −10° | 0.8 |

TABLE 4-continued

| First hip joint angle a1 | Duty ratio |
|---|---|
| . . . | . . . |
| $-\theta_{motion1\_1}$ | Maximum duty ratio |

When the first hip joint angle a1 is less than 5° even though the user lifts the first leg, the processor 120 may not apply any signal to each of the third switch 230 and the fourth switch 240 of the motor driver circuit 130 such that a resistance force may not be generated based on the resistance force generation setting information.

When the first hip joint angle a1 is 5°, the processor 120 may apply control signals 1 and 2 with a duty ratio of "0.7" to the third switch 230 and the fourth switch 240 of the motor driver circuit 130, respectively, based on the resistance force generation setting information.

When the first hip joint angle a1 increases, the processor 120 may increase the duty ratio based on the resistance force generation setting information and may apply control signals 1 and 2 with the increased duty ratio to the third switch 230 and the fourth switch 240, respectively. Accordingly, the duty ratio may increase, if the user lifts the first leg. Thus, the motor 140 may output a resistance force with a higher intensity.

When the first hip joint angle a1 is greater than or equal to $\theta_{motion1\_1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

When the user lowers the first leg in a situation in which the resistance force is output to the first leg, the first hip joint angle a1 may decrease. In this example, the processor 120 may reduce the duty ratio based on the resistance force generation setting information and apply control signals 1 and 2 with the reduced duty ratio to the third switch 230 and the fourth switch 240, respectively. If the user lowers the first leg, the duty ratio may decrease. Thus, the motor 140 may output a resistance force with a lower intensity.

In an example shown in FIG. 9A, it is assumed that a user wearing the wearable device 100-1 described with reference to FIG. 1B walks. Each of the motors 140 and 140-1 may be disposed around each hip joint, as described above with reference to FIG. 1C. When a stride of the user is out of a predetermined range, the wearable device 100-1 may guide the user to walk correctly by outputting a resistance force. To generate a resistance force in a right leg, resistance force generation setting information (e.g., Tables 5 and 6 shown below, or a relational expression corresponding to a graph shown in FIG. 9B) may be stored in the memory 160. Similarly, to generate a resistance force in a left leg, resistance force generation setting information (e.g., Tables 7 and 8 shown below, or a relational expression corresponding to a graph shown in FIG. 9C) may be stored in the memory 160.

TABLE 5

| Difference between negative reference angle −Y and negative right hip joint angle $-X_{right}$ | Duty ratio |
|---|---|
| −5° | 0.7 |
| . . . | . . . |
| −10° | 0.75 |
| . . . | . . . |
| $\theta_{motion2}$ | Maximum duty ratio |

TABLE 6

| Difference between positive reference angle Y and positive right hip joint angle $X_{right}$ | Duty ratio |
|---|---|
| −5° | 0.7 |
| . . . | . . . |
| −15° | 0.75 |
| . . . | . . . |
| $-\theta_{motion2}$ | Maximum duty ratio |

TABLE 7

| Difference between negative reference angle −Y and negative left hip joint angle $-X_{left}$ | Duty ratio |
|---|---|
| −5° | 0.7 |
| . . . | . . . |
| −15° | 0.75 |
| . . . | . . . |
| $-\theta_{motion2}$ | Maximum duty ratio |

TABLE 8

| Difference between positive reference angle Y and positive left hip joint angle $X_{left}$ | Duty ratio |
|---|---|
| −5° | 0.7 |
| . . . | . . . |
| −15° | 0.75 |
| . . . | . . . |
| $-\theta_{motion2}$ | Maximum duty ratio |

Figure 9A:
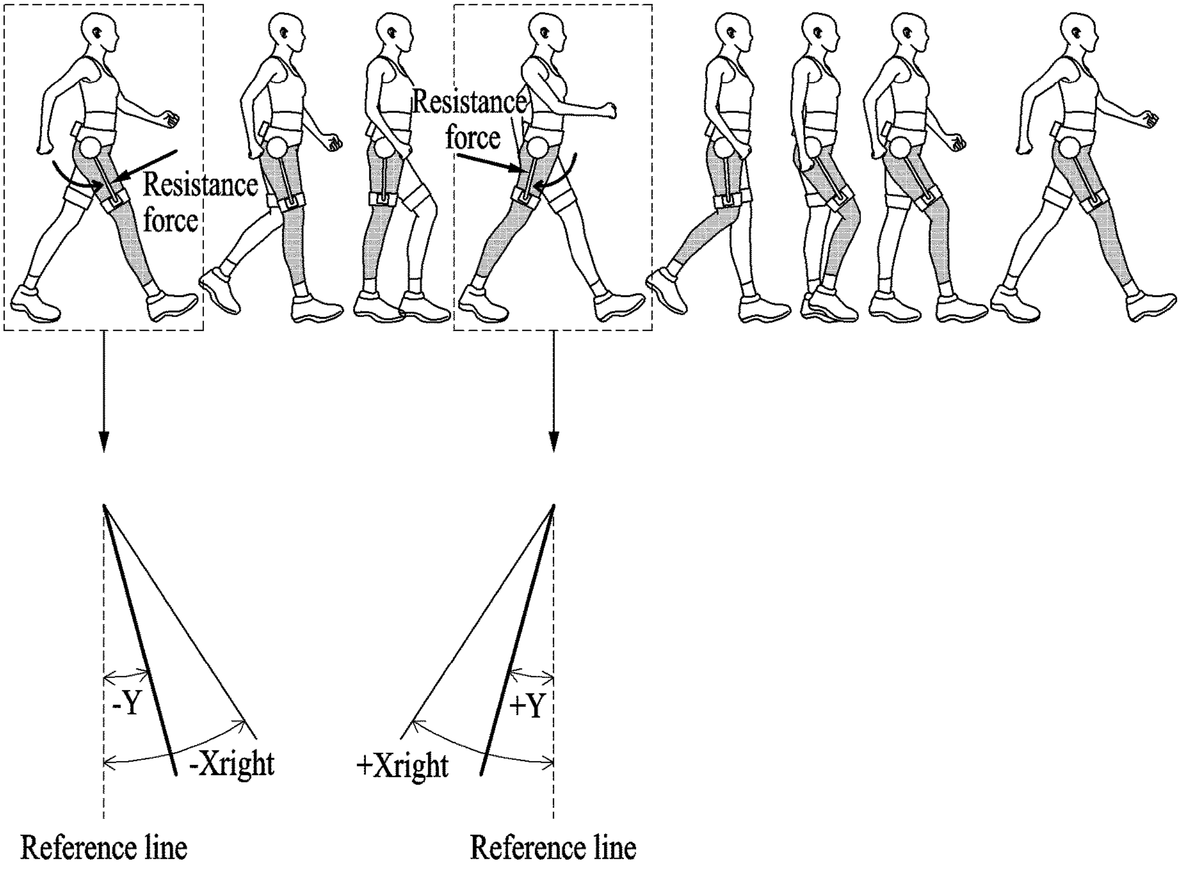
Figure 9B:
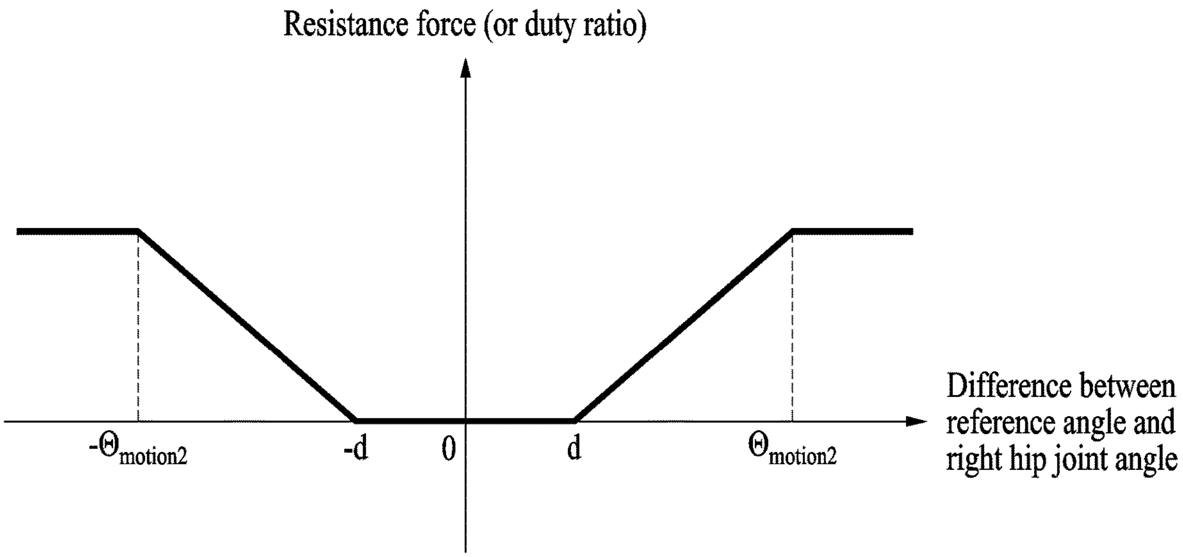
Figure 9C:
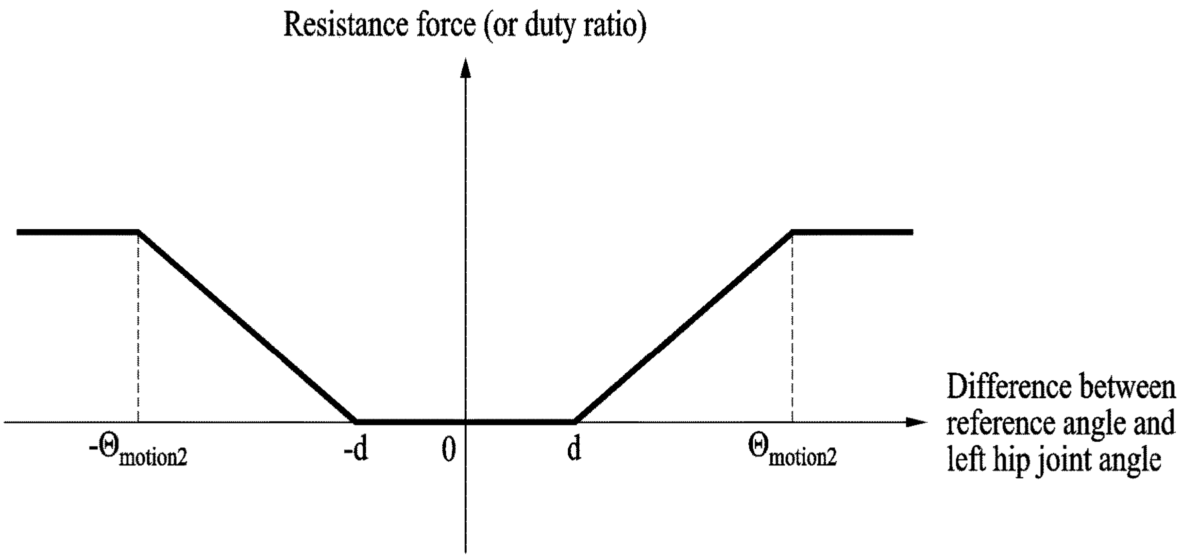

Tables 5 through 8 and the relational expressions corresponding to the graphs shown in FIGS. 9B and 9C are merely examples for explaining the resistance force generation setting information for the exercise of FIG. 9A. As understood by one of ordinary skill in the art, the resistance force generation setting information for the exercise of FIG. 9A is not limited to Tables 5 through 8 and the relational expressions corresponding to the graphs shown in FIGS. 9B and 9C.

Since the wearable device 100-1 outputs a resistance force to the left leg in the same manner as that of outputting the resistance force to the right leg, a method by which the wearable device 100-1 outputs the resistance force to the right leg is described in further detail below.

The motor driver circuit 130 near a right hip joint may be in the second control state, before the user walks.

The processor 120 may obtain the hip joint angle $-X_{right}$ of the right leg using the sensor 110. In the example shown in FIG. 9A, a hip joint angle when a leg of the user is in front of a reference line may correspond to a negative number, and a hip joint angle when the leg of the user is behind the reference line may correspond to a positive number.

The symbol $-X_{right}$ may be used for notation of the right hip joint angle when the right leg of the user is in front of the reference line.

The processor 120 may calculate "$-Y+X_{right}$" between a negative reference angle $-Y$ and the hip joint angle $-X_{right}$ of the right leg.

When "$-Y+X_{right}$" is less than a positive set value d based on the resistance force generation setting information, the processor 120 may maintain the second control state of the motor 140. According to some embodiments, the set value d may be "0."

When "$-Y+X_{right}$" is 5°, the processor 120 may obtain a duty ratio of "0.7" corresponding to 5° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When "$-Y+X_{right}$" increases as the user lifts the right leg higher by walking, the processor 120 may increase (or change) the duty ratio based on the resistance force generation setting information, and may apply control signals 1 and 2 with the increased (or changed) duty ratio to the third switch 230 and the fourth switch 240, respectively. Due to an increase in the duty ratio, the motor driver circuit 130 may be in the first control state for a relatively long time within one period, and accordingly, a resistance force with a higher intensity may be output.

For example, when "$-Y+X_{right}$" is increased to 15°, the processor 120 may obtain a duty ratio of "0.75" corresponding to 15° based on the resistance force generation setting information, and may apply control signals 1 and 2 with the duty ratio of "0.75" to the third switch 230 and the fourth switch 240 of the motor driver circuit 130, respectively. The control state of the motor driver circuit 130 may be repeatedly switched between the first control state and the second control state according to the duty ratio of "0.75", and accordingly, the motor 140 may output a resistance force with a higher intensity. The motor driver circuit 130 may be in the first control state for a relatively long time within one period when the duty ratio is "0.75" in comparison to when the duty ratio is "0.7". Accordingly, the motor 140 may output a resistance force with a higher intensity when the duty ratio is "0.75" in comparison to when the duty ratio is "0.7".

When "$-Y-X_{right}$" is greater than or equal to $\theta_{motion2}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

In a situation in which the resistance force is output to the right leg, the right hip joint angle $-X_{right}$ of the user may be reduced due to walking and "$-Y+X_{right}$" may be reduced. In this example, the processor 120 may reduce the duty ratio based on the resistance force generation setting information and apply control signals 1 and 2 with the reduced duty ratio to the third switch 230 and the fourth switch 240, respectively. When the right hip joint angle $-X_{right}$ is reduced, the duty ratio may be reduced, and accordingly, the motor 140 may output a resistance force with a relatively low intensity.

When "$-Y+X_{right}$" is less than the positive set value d, the processor 120 may not apply any signal to the third switch 230 and the fourth switch 240 such that the third switch 230 and the fourth switch 240 may be turned off. Accordingly, the motor driver circuit 130 may be in the second control state, and the resistance force may not be output from the motor 140.

By walking, the right leg may be behind the reference line.

When a difference "$Y-X_{right}$" between the positive reference angle Y and the hip joint angle $+X_{right}$ of the right leg is less than or equal to a negative set value $-d$ and when "$Y-X_{right}$" is $-5°$, the processor 120 may obtain a duty ratio of "0.7" corresponding to $-5°$ based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When "$Y-X_{right}$" increases in the negative direction to $-15°$, the processor 120 may obtain a duty ratio of "0.75" corresponding to $-15°$ based on the resistance force generation setting information, and may apply control signals 1 and 2 with the duty ratio of "0.75" to the third switch 230 and the fourth switch 240 of the motor driver circuit 130, respectively. The control state of the motor driver circuit 130 may be repeatedly switched between the first control state and the second control state according to the duty ratio of "0.75", and accordingly, the motor 140 may output a resistance force.

When "$Y-X_{right}$" is less than or equal to $-\theta_{motion2}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

The motor 140-1 may output a resistance force to the left leg in a similar manner that the motor 140 outputs the resistance force to the right leg. When a difference "$-Y+X_{left}$" between a negative reference angle $-Y$ and a left hip joint angle $-X_{left}$ is greater than or equal to "0" and less than "d", the motor 140-1 may not output a resistance force. When a duty ratio increases as "$-Y+X_{left}$" increases from "d", the motor 140-1 may output a resistance force with a relatively high intensity to the left leg. When "$-Y+X_{left}$" is greater than or equal to $\theta_{motion2}$, the motor 140-1 may output a resistance force with a maximum intensity to the left leg. Similarly, when a difference "$Y-X_{left}$" between a positive reference angle Y and a left hip joint angle $+X_{left}$ is less than or equal to "0" and greater than or equal to "$-d$", the motor 140-1 may not output a resistance force. When the duty ratio increases as "$Y-X_{left}$" decreases from "$-d$", the motor 140-1 may output a resistance force with a relatively high intensity to the left leg. When "$Y-X_{left}$" is less than or equal to $-\theta_{motion2}$, the motor 140-1 may output the resistance force with the maximum intensity to the left leg.

In the example described with reference to FIGS. 9A through 9C, the wearable device 100-1 may output the resistance force to the user, when a difference between a reference angle and a hip joint angle of the right leg is out of a range of "$-d$" to "d", and when a difference between the reference angle and a hip joint angle of the left leg is out of the range of "–d" to "d". Accordingly, the wearable device 100-1 may guide the user to walk so that both hip joint angles may rotate within a predetermined range. In addition, the wearable device 100-1 may guide the user to walk such that a stride of the right leg and a stride of the left leg may substantially be the same.

In example embodiments, the processor 120 may allow a resistance force to be output based on the right hip joint angle and the left hip joint angle. More specifically, the memory 160 may store resistance force generation setting information (e.g., Tables 9 and 10 shown below, or relational expressions corresponding to Tables 9 and 10) for generating a resistance force according to a right hip joint angle increased to be greater than or equal to a predetermined angle, and may store resistance force generation setting information (e.g., Tables 11 and 12 shown below, or relational expressions corresponding to Tables 11 and 12) for generating a resistance force according to a left hip joint angle increased to be greater than or equal to a predetermined angle.

TABLE 9

| Right hip joint angle $-X_{right}$ | Duty ratio |
|---|---|
| −15° | 0.7 |
| . . . | . . . |
| −20° | 0.75 |
| . . . | . . . |
| $-\theta_{motion2\_1}$ | Maximum duty ratio |

TABLE 10

| Right hip joint angle $X_{right}$ | Duty ratio |
|---|---|
| 15° | 0.7 |
| . . . | . . . |
| 20° | 0.75 |
| . . . | . . . |
| $-\theta_{motion2\_1}$ | Maximum duty ratio |

TABLE 11

| Left hip joint angle $-X_{left}$ | Duty ratio |
|---|---|
| −15° | 0.7 |
| . . . | . . . |
| −20° | 0.75 |
| . . . | . . . |
| $-\theta_{motion2\_1}$ | Maximum duty ratio |

TABLE 12

| Left hip joint angle $X_{left}$ | Duty ratio |
|---|---|
| 15° | 0.7 |
| . . . | . . . |
| 20° | 0.75 |
| . . . | . . . |
| $-\theta_{motion2\_1}$ | Maximum duty ratio |

Before the user starts walking, the motor driver circuit 130 may be in the second control state.

When the user walks by rotating the right leg forward, the right hip joint angle $-X_{right}$ may be increased. When the right hip joint angle $-X_{right}$ is greater than −15° (for example, when the right hip joint angle $-X_{right}$ is −10°) based on the resistance force generation setting information, the processor 120 may maintain the second control state of the motor driver circuit 130.

When the right hip joint angle $-X_{right}$ is −15°, the processor 120 may obtain a duty ratio of "0.7" corresponding to −15° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When the right hip joint angle $-X_{right}$ increases in the negative direction, the processor 120 may increase the duty ratio based on the resistance force generation setting information and may apply control signals 1 and 2 with the increased duty ratio to the third switch 230 and the fourth switch 240, respectively. Due to an increase in the duty ratio, the motor 140 may output a resistance force with a higher intensity.

When the right hip joint angle $-X_{right}$ is less than or equal to $-\theta_{motion2\_1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

In a situation in which the resistance force is output to the right leg, the right hip joint angle $-X_{right}$ may be reduced due to walking. In this example, the processor 120 may reduce the duty ratio based on the resistance force generation setting information and apply control signals 1 and 2 with the reduced duty ratio to the third switch 230 and the fourth switch 240, respectively. When the right hip joint angle $-X_{right}$ decreases, the duty ratio may decrease. Thus, the motor 140 may output a resistance force with a relatively low intensity.

When the right hip joint angle $-X_{right}$ is greater than −15° (for example, when the right hip joint angle $-X_{right}$ is −5°), the processor 120 may not apply any signal to the third switch 230 and the fourth switch 240 such that the third switch 230 and the fourth switch 240 may be turned off. Accordingly, the motor driver circuit 130 may be in the second control state, and the resistance force may not be output from the motor 140.

By walking, the right leg may be behind the reference line.

When the hip joint angle $X_{right}$ of the right leg is 15°, the processor 120 may obtain a duty ratio of "0.7" corresponding to 15° based on the resistance force generation setting information, and may apply control signals 1 and 2 with the duty ratio of "0.7" to the third switch 230 and the fourth switch 240 of the motor driver circuit 130, respectively. The control state of the motor driver circuit 130 may be repeatedly switched between the first control state and the second control state according to the duty ratio of "0.7", and accordingly, the motor 140 may output a resistance force.

When the right hip joint angle $X_{right}$ increases, the processor 120 may increase the duty ratio based on the resistance force generation setting information and may apply control signals 1 and 2 with the increased duty ratio to the third switch 230 and the fourth switch 240, respectively. Due to an increase in the duty ratio, the motor 140 may output a resistance force with a higher intensity.

When the right hip joint angle $X_{right}$ is greater than or equal to $\theta_{motion2\_1}$, the processor 120 may apply control signals 1 and 2 with a maximum duty ratio (e.g., "0.99") to the third switch 230 and the fourth switch 240, respectively. The control state of the motor driver circuit 130 may be repeatedly switched between the first control state and the second control state according to the maximum duty ratio, and accordingly, the motor 140 may output a resistance force with a maximum intensity.

The motor 140-1 may output a resistance force to the left leg in a similar manner that the motor 140 outputs the resistance force to the right leg. When the left hip joint angle $-X_{left}$ is less than "0" and greater than −15°, the motor 140-1 may not output a resistance force. When the left hip joint angle $-X_{left}$ increases in the negative direction from −15°, the duty ratio may increase, and accordingly, the motor 140-1 may output a resistance force with a relatively high intensity to the left leg. When the left hip joint angle $-X_{left}$ is less than or equal to $-\theta_{motion2\_1}$, the motor 140-1 may output a resistance force with a maximum intensity to the left leg. When the left hip joint angle $X_{left}$ is greater than "0" and less than 15°, the motor 140-1 may not output a resistance force. When the left hip joint angle $X_{left}$ increases from 15°, the duty ratio may increase, and accordingly, the motor 140-1 may output a resistance force with a relatively high intensity to the left leg. When the left hip joint angle $X_{left}$ is greater than or equal to $\theta_{motion2\_1}$, the motor 140-1 may output a resistance force with a maximum intensity to the left leg.

Figure 10A:
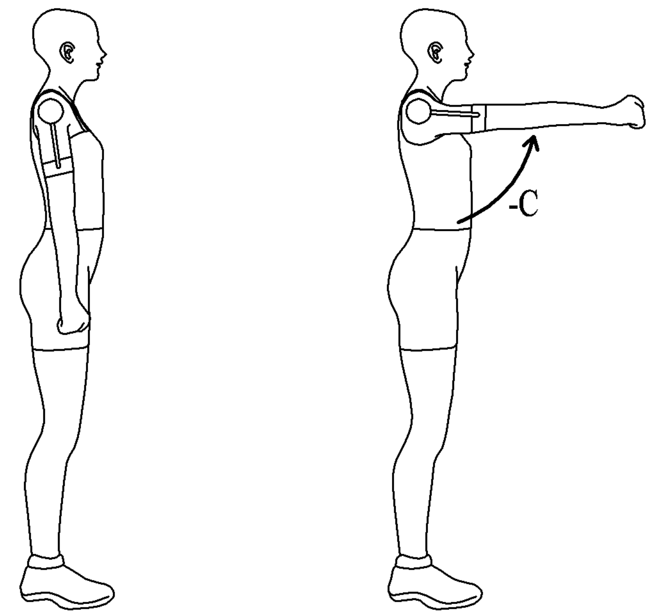
Figure 10B:
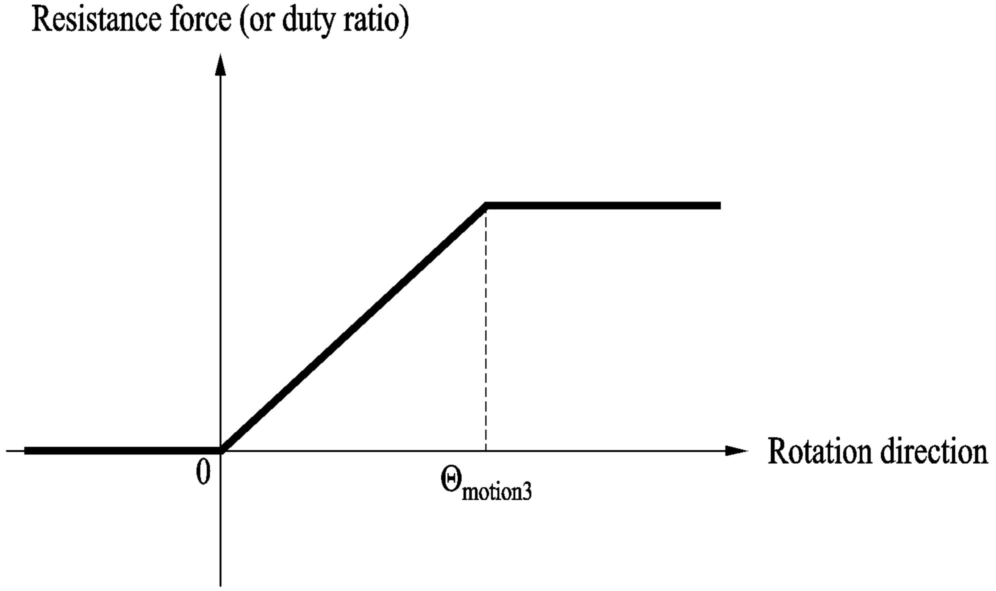

In an example shown in FIG. 10A, a user may be wearing the wearable device 100 described above with reference to FIG. 1A while performing an exercise of lifting a first arm. The above exercise is directed towards obtaining an effect of strength training since a resistance force output from the wearable device 100 increases if the user lifts the first arm higher. When the user lowers the lifted first arm, the wearable device 100 may not output a resistance force. For example, the wearable device 100 may output a resistance force when a preset rotation direction and a rotation direction of a first shoulder joint angle match, and may not output the resistance force when the preset rotation direction and the rotation direction of the first shoulder joint angle do not match. Resistance force generation setting information (e.g., Table 13 shown below, or a relational expression corresponding to a graph shown in FIG. 10B) for generating a resistance force may be stored in a memory of the wearable device 100.

TABLE 13

| Difference between reference angle −e and first shoulder joint angle −c | Duty ratio |
|---|---|
| 1° | 0.7 |
| . . . | . . . |
| 45° | 0.85 |
| . . . | . . . |
| $\theta_{motion3}$ | Maximum duty ratio |

Before the user starts exercising, the motor driver circuit 130 of the wearable device 100 may be in the second control state.

When the user exercises, the processor 120 may obtain the first shoulder joint angle −c using the sensor 110. In the example shown in FIG. 10, the first shoulder joint angle obtained when the user lifts the first arm may be a negative number.

The symbol −c may be used for notation of the first shoulder joint angle.

The processor 120 may calculate a difference "−e+c" between the reference angle −e and the first shoulder joint angle −c.

When "−e+c" increases, the processor 120 may estimate or determine the rotation direction of the first shoulder joint to be a counterclockwise direction. When the preset rotation direction is the counterclockwise direction, the processor 120 may determine that the rotation direction of the first shoulder joint matches the preset rotation direction.

When the rotation direction of the first shoulder joint matches the preset direction and when "−e+c" is 1°, the processor 120 may obtain a duty ratio of "0.7" corresponding to 1° based on the resistance force generation setting information, and may apply control signals 1 and 2 with the duty ratio of "0.7" to the third switch 230 and the fourth switch 240, respectively. The control state of the motor driver circuit 130 may be repeatedly switched between the first control state and the second control state according to the duty ratio of "0.7", and accordingly, the motor 140 may output a resistance force.

When "−e+c" increases as the user lifts the first arm higher, the processor 120 may increase the duty ratio based on the resistance force generation setting information, and may apply control signals 1 and 2 with the increased duty ratio to the third switch 230 and the fourth switch 240, respectively. Due to an increase in the duty ratio, the motor driver circuit 130 may be in the first control state for a relatively long time within one period, and accordingly, a resistance force with a higher intensity may be output.

For example, when "−e+c" becomes 45°, the processor 120 may obtain a duty ratio of "0.85" corresponding to 45° based on the resistance force generation setting information, and may apply control signals 1 and 2 with the duty ratio of "0.85" to the third switch 230 and the fourth switch 240 of the motor driver circuit 130, respectively. The control state of the motor driver circuit 130 may be repeatedly switched between the first control state and the second control state according to the duty ratio of "0.85", and accordingly, the motor 140 may output a resistance force. The motor driver circuit 130 may be in the first control state for a relatively long time within one period when the duty ratio is "0.85", in comparison to when the duty ratio is "0.7". Accordingly, the motor 140 may output a resistance force with a higher intensity when the duty ratio is "0.85", in comparison to when the duty ratio is "0.7".

When the user lowers the first arm, "−e+c" may be reduced. Here, the processor 120 may determine that the rotation direction of the first shoulder joint does not match the counterclockwise direction that is set in advance, and may not apply any signal to the third switch 230 and the fourth switch 240 such that the third switch 230 and the fourth switch 240 may be turned off. Accordingly, when the user lowers the first arm, the motor 140 may not output the resistance force.

In example embodiments, the processor 120 may allow a resistance force to be output based on the first shoulder joint angle −c. More specifically, the memory 160 may store resistance force generation setting information (e.g., Table 14 shown below, or a relational expression corresponding to Table 14) for generating a resistance force according to the first shoulder joint angle −c when the rotation direction of the first shoulder joint matches the preset rotation direction and when the first shoulder joint angle −c is greater than or equal to a predetermined angle.

TABLE 14

| First shoulder joint angle −c | Duty ratio |
|---|---|
| −10° | 0.7 |
| . . . | . . . |
| −35° | 0.85 |
| . . . | . . . |
| $-\theta_{motion3\_1}$ | Maximum duty ratio |

When the first shoulder joint angle −c increases in the negative direction as the user lifts the first arm, the processor 120 may determine that the rotation direction of the first shoulder joint matches the counterclockwise direction that is set in advance. Here, when the first shoulder joint angle −c corresponds to −10°, the processor 120 may obtain a duty ratio of "0.7" corresponding to −10° based on the resistance force generation setting information, and may apply control signals 1 and 2 with the duty ratio of "0.7" to the third switch 230 and the fourth switch 240, respectively. The control state of the motor driver circuit 130 may be repeatedly switched between the first control state and the second control state according to the duty ratio of "0.7", and accordingly, the motor 140 may output a resistance force.

When the first shoulder joint angle −c increases in the negative direction as the user lifts the first arm higher, the processor 120 may increase the duty ratio based on the resistance force generation setting information, and may apply control signals 1 and 2 with the increased duty ratio to the third switch 230 and the fourth switch 240, respectively. Due to an increase in the duty ratio, the motor 140 may output a resistance force with a higher intensity.

When the user lowers the first arm, the first shoulder joint angle −c may be reduced. Here, the processor 120 may determine that the rotation direction of the first shoulder joint does not match the counterclockwise direction that is set in advance, and may not apply any signal to the third switch 230 and the fourth switch 240 such that the third switch 230 and the fourth switch 240 may be turned off. Accordingly, when the user lowers the first arm, the motor 140 may not output the resistance force.

Figure 11A:
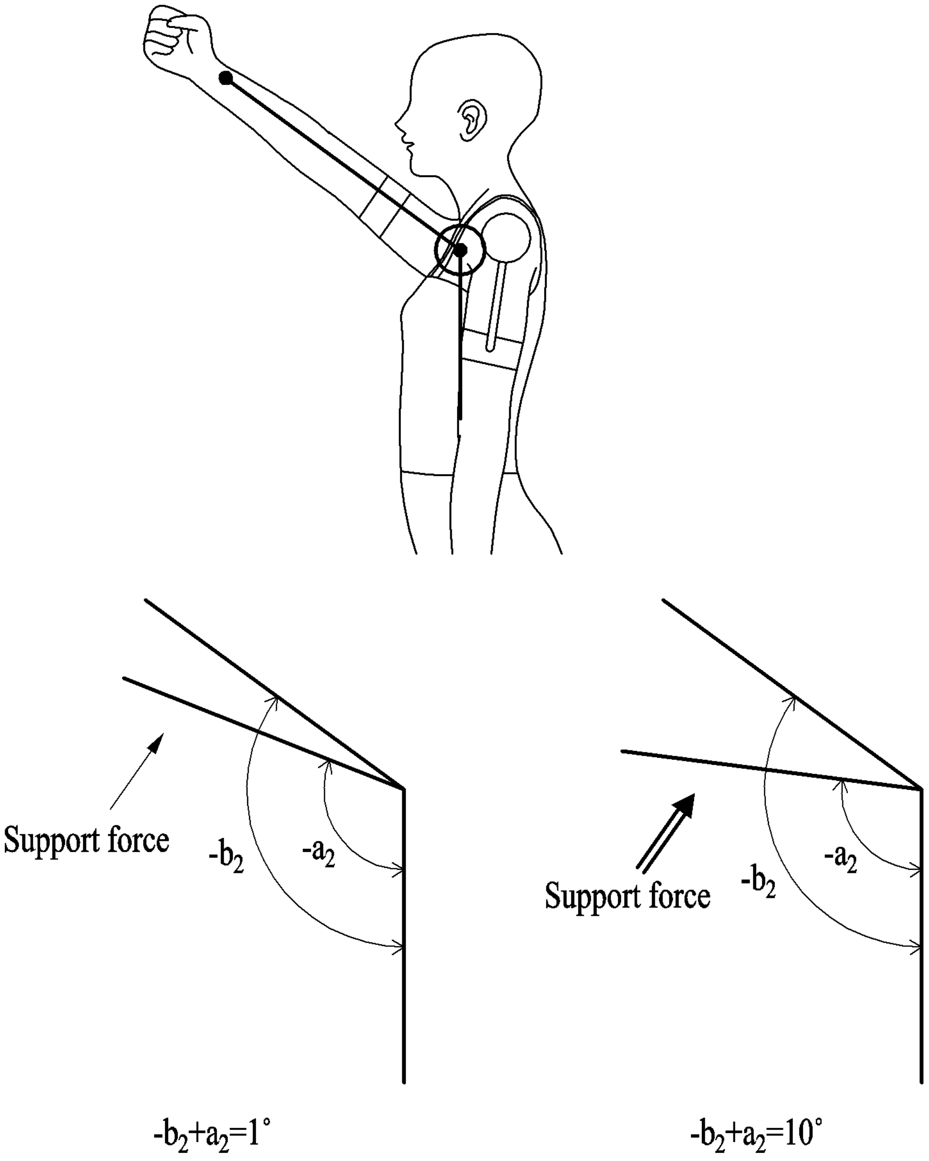
FIGS. 11A and 11B are diagrams illustrating an example in which a wearable device provides a support force to a user according to example embodiments.
Figure 11B:
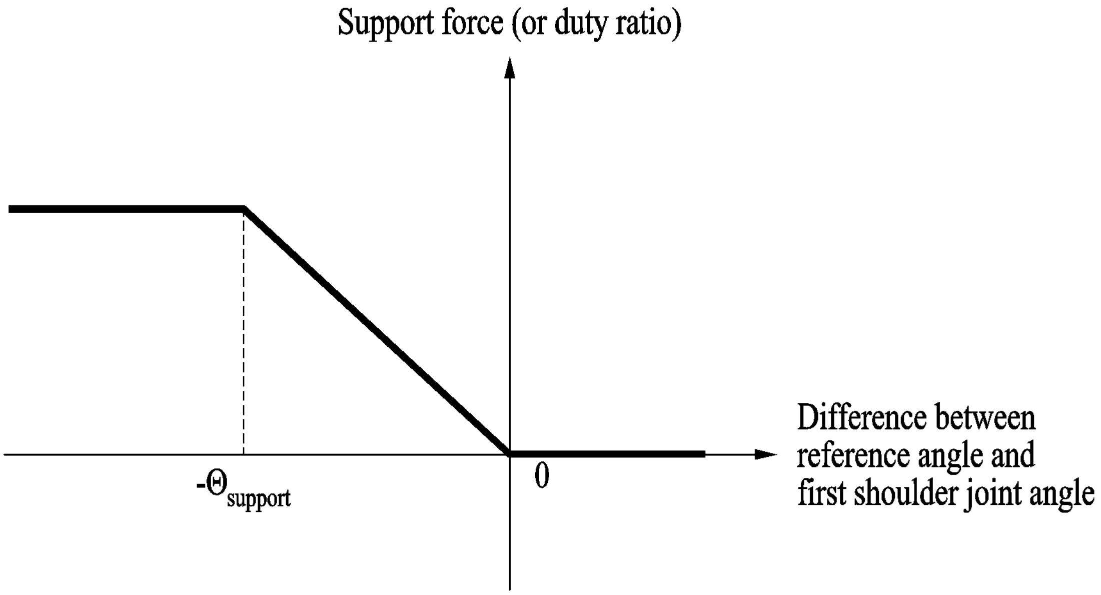

FIGS. 11A and 11B are diagrams illustrating an example in which a wearable device provides a support force to a user according to example embodiments.

Referring to FIG. 11A, it is assumed that a user wears the wearable device 100-1 described above with reference to FIG. 1B and works with a first arm. If the first arm is lowered by an angle less than or equal to a reference angle, a support force output by the wearable device 100-1 may increase to assist the user in working. Support force generation setting information (e.g., Table 15 shown below, or a relational expression corresponding to a graph shown in FIG. 11B) for generating a support force may be stored in a memory of the wearable device 100-1.

TABLE 15

| Difference between reference angle −b2 and first shoulder joint angle −a2 | Duty ratio |
|---|---|
| −1° | 0.7 |
| . . . | . . . |
| −10° | 0.85 |
| . . . | . . . |
| $-\theta_{support}$ | Maximum duty ratio |

The processor 120 may obtain the first shoulder joint angle −a2 using the sensor 110.

The processor 120 may calculate a difference "−b2+a2" between the reference angle −b2 and the first shoulder joint angle −a2.

When the user lowers the first arm at an angle less than or equal to the reference angle −b2, the first shoulder joint angle −a2 may be reduced. When "−b2+a2" is less than or equal to a set value of "0", the processor 120 may assist the user in working.

More specifically, when "−b2+a2" is −1°, the processor 120 may obtain the duty ratio of "0.7" based on the support force generation setting information, and apply control signals 1 and 2 with the duty ratio of "0.7" to the third switch 230 and the fourth switch 240, respectively. The control state of the motor driver circuit 130 may be repeatedly switched between the first control state and the second control state according to the duty ratio of "0.7", and accordingly, the motor 140 may output a support force. When "−b2+a2" increases in the negative direction as the first arm is lowered further down, the processor 120 may increase the duty ratio based on the support force generation setting information, and may apply control signals 1 and 2 with the increased duty ratio to the third switch 230 and the fourth switch 240, respectively. Due to an increase in the duty ratio, the motor 140 may output a support force with a higher intensity.

In some embodiments, the processor 120 may allow a support force to be output based on the first shoulder joint angle −a2. More specifically, the memory 160 may store support force generation setting information (e.g., Table 16 shown below, or a relational expression corresponding to Table 16) for generating a support force according to the first shoulder joint angle −a2 increased to be greater than or equal to a predetermined angle.

TABLE 16

| First shoulder joint angle −a2 | Duty ratio |
|---|---|
| −85° | 0.7 |
| . . . | . . . |
| −70° | 0.85 |
| . . . | . . . |
| $-\theta_{support\_1}$ | Maximum duty ratio |

When the user lowers the first arm while working with the first arm, the first shoulder joint angle −a2 may be reduced. When the first shoulder joint angle −a2 is reduced to be less than −85°, the processor 120 may assist the user in working. More specifically, when the first shoulder joint angle −a2 is −85°, the processor 120 may obtain a duty ratio of "0.7" based on the support force generation setting information, and apply control signals 1 and 2 with the duty ratio of "0.7" to the third switch 230 and the fourth switch 240, respectively. The control state of the motor driver circuit 130 may be repeatedly switched between the first control state and the second control state according to the duty ratio of "0.7", and accordingly, the motor 140 may output a support force. When the first shoulder joint angle −a2 decreases as the first arm is lowered further down, the processor 120 may increase the duty ratio based on the support force generation setting information, and may apply control signals 1 and 2 with the increased duty ratio to the third switch 230 and the fourth switch 240, respectively. Due to an increase in the duty ratio, the motor 140 may output a support force with a higher intensity.

Figure 12A:
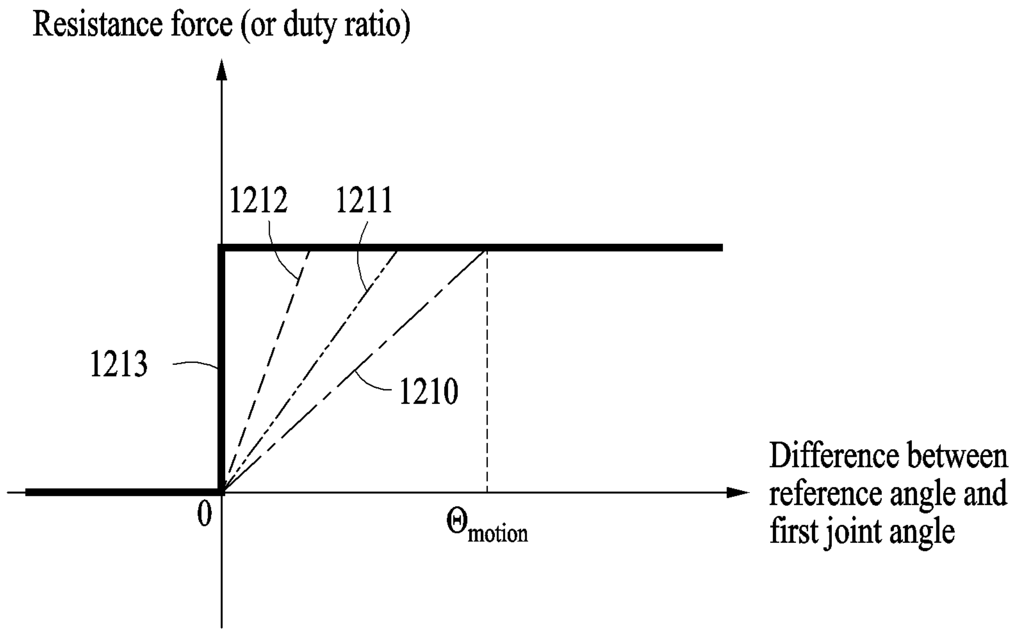
FIGS. 12A and 12B are diagrams illustrating an adjustment of an intensity of a resistance force in a second resistance mode of a wearable device according to example embodiments.
Figure 12B:
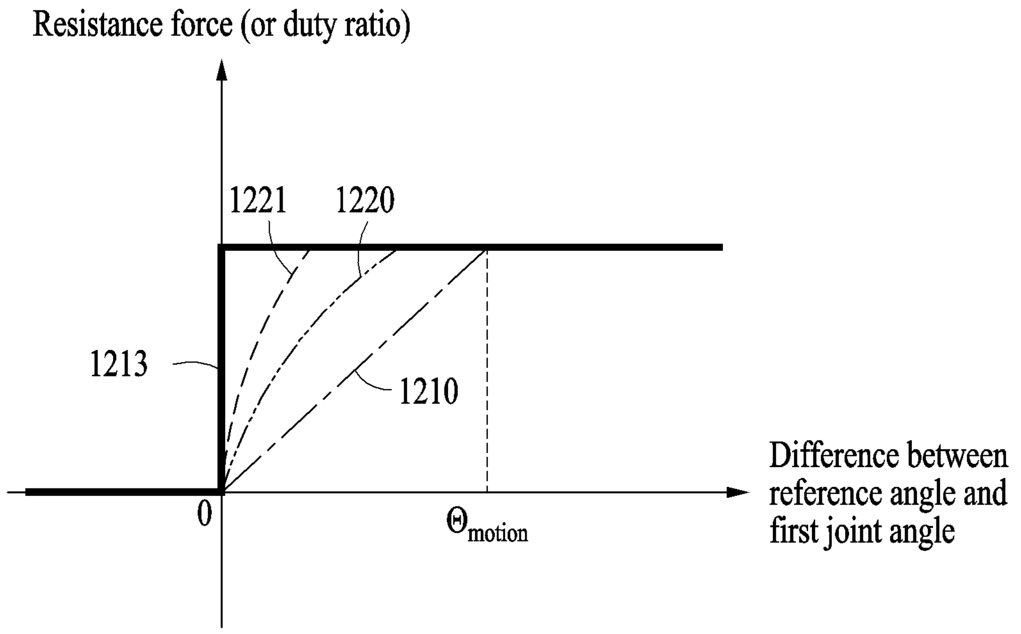

FIGS. 12A and 12B are diagrams illustrating an adjustment of an intensity of a resistance force in a second resistance mode of a wearable device according to some embodiments.

A user may request the wearable devices 100 and 100-1 described with reference to FIGS. 1A and 1B to adjust the intensity through the input interface 170 so that a resistance force with a higher intensity or a lower intensity may be output. In an example, the user may utter "increase (or decrease) the intensity by one level" and a microphone of the wearable device 100, 100-1 may receive voice uttered by the user. In another example, resistance force intensity values of multiple levels may be displayed on a display of the wearable device 100, 100-1, and the user may select one of the displayed resistance force intensity values.

In FIG. 12A, in response to a user input to increase the intensity of the resistance force by one level, the processor 120 may generate a second graph 1211 by increasing a slope of a first graph 1210. The processor 120 may control the motor driver circuit 130 based on the second graph 1211. For the same difference between a reference angle and a first joint angle, a resistance force with a higher intensity may be output in the second graph 1211 in comparison to the first graph 1210.

In response to a user input to further increase the intensity of the resistance force by one level in a situation in which the resistance force is output according to the second graph 1211, the processor 120 may generate a third graph 1212 by increasing a slope of the second graph 1211 and may control the motor driver circuit 130 so that the resistance force may be output according to the third graph 1212. For the same difference between the reference angle and the first joint angle, a resistance force with a higher intensity may be output in the third graph 1212 in comparison to the second graph 1211.

In response to a user input to increase the intensity of the resistance force to the maximum level in a situation in which the resistance force is output according to the third graph 1212, the processor 120 may generate a fourth graph 1213 by increasing a slope of the third graph 1212 and may control the motor driver circuit 130 so that the resistance force may be output according to the fourth graph 1213. In the fourth graph 1213, if the difference between the reference angle and the first joint angle corresponds to a set value of "0," a resistance force with a maximum intensity may be output.

In some embodiments, in response to a user input to increase the intensity of the resistance force, the processor 120 may increase the intensity of the resistance force by changing to a nonlinear graph.

In an example shown in FIG. 12B, in response to a user input to increase the intensity of the resistance force by one level in a situation in which the resistance force is output according to a first graph 1210, the processor 120 may change the first graph 1210 to a first nonlinear graph 1220 and may control the motor driver circuit 130 so that the resistance force may be output according to the first nonlinear graph 1220. For the same difference between the reference angle and the first joint angle, a resistance force with a higher intensity may be output in the first nonlinear graph 1220 in comparison to the first graph 1210.

In response to a user input to further increase the intensity of the resistance force by one level in a situation in which the resistance force is output according to the first nonlinear graph 1220, the processor 120 may change the first nonlinear graph 1220 to a second nonlinear graph 1221 and may control the motor driver circuit 130 so that the resistance force may be output according to the second nonlinear graph 1221. For the same difference between the reference angle and the first joint angle, a resistance force with a higher intensity may be output in the second nonlinear graph 1221 in comparison to the first nonlinear graph 1220.

In response to a user input to increase the intensity of the resistance force to the maximum level in a situation in which the resistance force is output according to the second nonlinear graph 1221, the processor 120 may change the second nonlinear graph 1221 to a fourth graph 1213 and may control the motor driver circuit 130 so that the resistance force may be output according to the fourth graph 1213.

Similar to the description provided with reference to FIGS. 12A and 12B, the processor 120 may change the graphs shown in FIGS. 8B, 8C, 9B, 9C, 10B, and 11B. More specifically, if a user input to increase the intensity of the resistance force in the exercise illustrated in FIG. 8A is received from a user, the processor 120 may change the graph of FIG. 8B or 8C, similar to the description provided with reference to FIG. 12A or 12B. If a user input to increase the intensity of the resistance force in the exercise of FIG. 9A is received from a user, the processor 120 may change the graphs of FIGS. 9B and 9C, similar to the description provided with reference to FIG. 12A or 12B. If a user input to increase the intensity of the resistance force in the exercise of FIG. 10A is received from a user, the processor 120 may change the graph of FIG. 10B, similar to the description provided with reference to FIG. 12A or 12B. If a user input to increase the intensity of the support force in the work of FIG. 11B is received from a user, the processor 120 may change the graph of FIG. 11B, similar to the description provided with reference to FIG. 12A or 12B.

Figure 13:
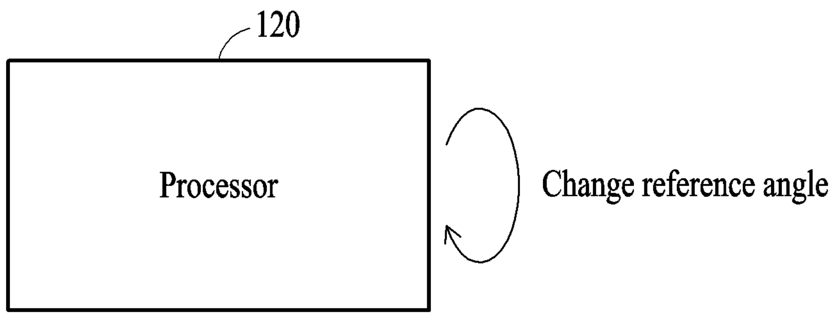
FIG. 13 is a diagram illustrating a change in a reference angle in a second resistance mode of a wearable device according to example embodiments.

FIG. 13 is a diagram illustrating a change in a reference angle in a second resistance mode of a wearable device according to example embodiments.

In FIG. 13, a user may be performing the exercise described with reference to FIG. 8A. In an example, when the user lifts his or her leg by a relatively small angle, a relatively narrow reference angle may be input through the input interface 170 such that a resistance force may be output. In another example, when the user lifts the leg by a relatively large angle, a relatively wide reference angle may be input through the input interface 170 so that a resistance force may be output. The processor 120 may change the reference angle to a reference angle input by the user.

For example, the reference angle before the change may be −15°. In this example, when a hip joint angle of the leg is −16°, the processor 120 may apply the control signals 1 and 2 with the duty ratio of "0.7" in Table 1 described above to the third switch 230 and the fourth switch 240 of the motor driver circuit 130, respectively. The motor 140 may output a resistance force with an intensity corresponding to the duty ratio of "0.7." For example, when the user lifts the leg by 16° in a state in which the reference angle is −15°, the resistance force with the intensity corresponding to the duty ratio of "0.7" may be provided to the user.

The user may input the reference angle changed to −5° through the input interface 170, and the processor 120 may change the reference angle from −15° to −5°.

When the hip joint angle of the leg is −6°, the processor 120 may apply the control signals 1 and 2 with the duty ratio of "0.7" in Table 1 described above to the third switch 230 and the fourth switch 240 of the motor driver circuit 130, respectively. The motor 140 may output a resistance force with an intensity corresponding to the duty ratio of "0.7." For example, when the user lifts the leg by 6° in a situation in which the reference angle is changed to −5°, the resistance force with the intensity corresponding to the duty ratio of "0.7" may be provided to the user. Thus, the resistance force may be provided to the user when the user lifts the leg less than the scenario when the reference angle is −15°.

The user may input the reference angle changed to −20° through the input interface 170, and the processor 120 may change the reference angle from −15° to −20°.

When the hip joint angle of the leg is −21°, the processor 120 may apply the control signals 1 and 2 with the duty ratio of "0.7" in Table 1 described above to the third switch 230 and the fourth switch 240 of the motor driver circuit 130, respectively. When the user lifts the leg by 21°, the resistance force with the intensity corresponding to the duty ratio of "0.7" may be provided to the user. For example, when the user lifts the leg further up in comparison to when the reference angle is −15°, the resistance force may be provided.

The processor 120 may change the reference angle so that the user may be provided with the resistance force in various motion angle ranges.

Similar to the description provided with reference to FIG. 13, the processor 120 may change the reference angle described with reference to FIGS. 9A through 11B.

FIGS. 14A through 14D are diagrams illustrating a change in a set value in a second resistance mode of a wearable device according to some embodiments.

Figure 14A:
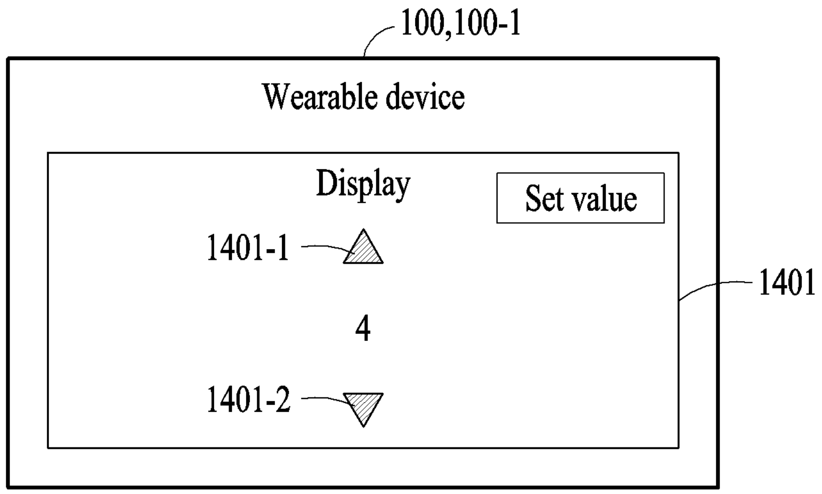
FIGS. 14A through 14C are diagrams illustrating a change in a set value in a second resistance mode of a wearable device according to example embodiments.

Referring to FIG. 14A, a UI for changing a set value may be displayed on a display 1401 of the wearable device 100, 100-1. The UI may include a soft key 1401-1 for increasing the set value, and a soft key 1401-2 for reducing the set value. In FIG. 14A, the processor 120 may increase the set value when a user presses the soft key 1401-1, and may reduce the set value when the user presses the soft key 1401-2.

Figure 14B:
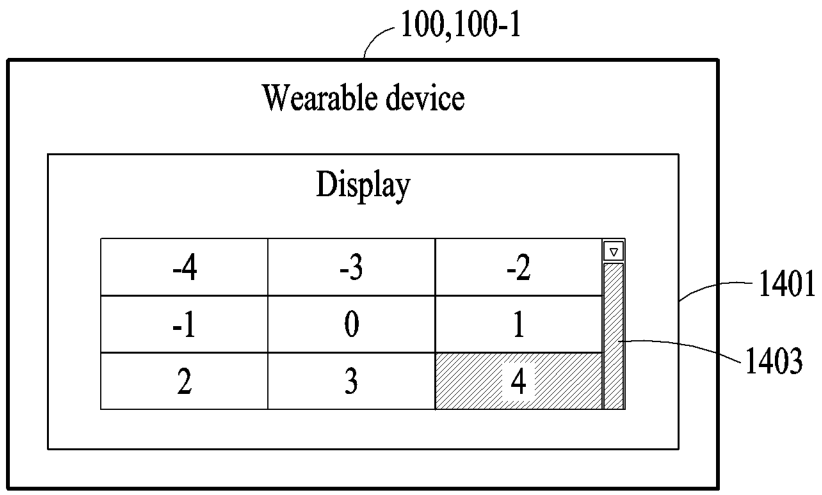

Referring to FIG. 14B, various set values may be displayed on the display 1401 of the wearable device 100, 100-1 in the form of a table. The user may move a screen using the scroll bar 1403. The user may select one of the set values displayed on the display 1401.

Figure 14C:
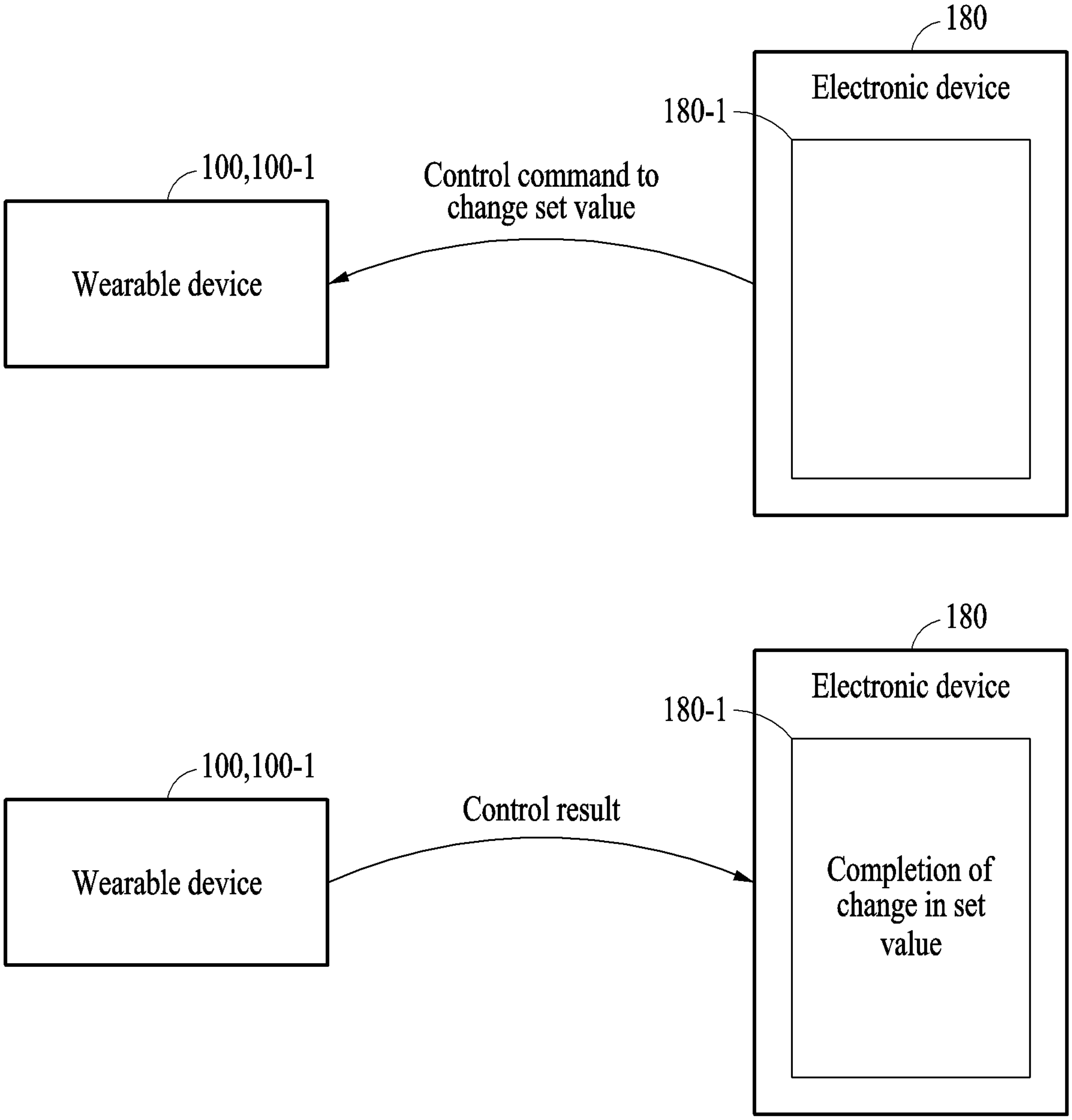

Referring to FIG. 14C, the electronic device 180-1 may display a UI for changing a set value on the display 180-1. Such a UI may include the softkeys 1401-1 and 1401-2 described with reference to FIG. 14A or the table described with reference to FIG. 14B, but is not limited thereto.

The user may select a specific set value through the UI displayed on the display 180-1, and the electronic device 180-1 may transmit a control command to change the set value to the wearable device 100, 100-1. Here, the control command to change the set value may include a set value selected by the user.

When the control command to change the set value is received from the electronic device 180-1, the wearable device 100, 100-1 may change the set value to the set value selected by the user according to the received control command and may transmit a control result of completion of a change in the set value to the electronic device 180-1.

When the control result is received from the wearable device 100, 100-1, the electronic device 180-1 may display a message indicating the completion of the change in the set value on the display 180-1.

In some embodiments, the changing of a set value as described in FIGS. 14A through 14C does not limit the user's ability to change the set value or input a new set value through the input interface 170.

In response to a user input (or control command) to change the set value from "0" to "4," the processor 120 may change the set value from "0" to "4" so that a first graph 1410 may be changed to a second graph 1420. When a difference between a reference angle and a first joint angle is greater than or equal to 4°, the processor 120 may control the motor driver circuit 130 such that a resistance force may be output according to the second graph 1420. When the set value is "4" rather than "0," the user may be provided with the resistance force only when the user further moves the first joint.

In response to a user input (or control command) to change the set value from "0" to "−4," the processor 120 may change the set value from "0" to "−4" so that the first graph 1410 may be changed to a third graph 1430. When the difference between the reference angle and a joint angle is greater than or equal to −4°, the processor 120 may control the motor driver circuit 130 such that the resistance force may be output according to the third graph 1430. When the set value is "−4" rather than "0," the user may be provided with the resistance force even though the first joint is moved less.

The processor 120 may change the reference angle so that the user may be provided with the resistance force in various motion angle ranges.

Figure 15:
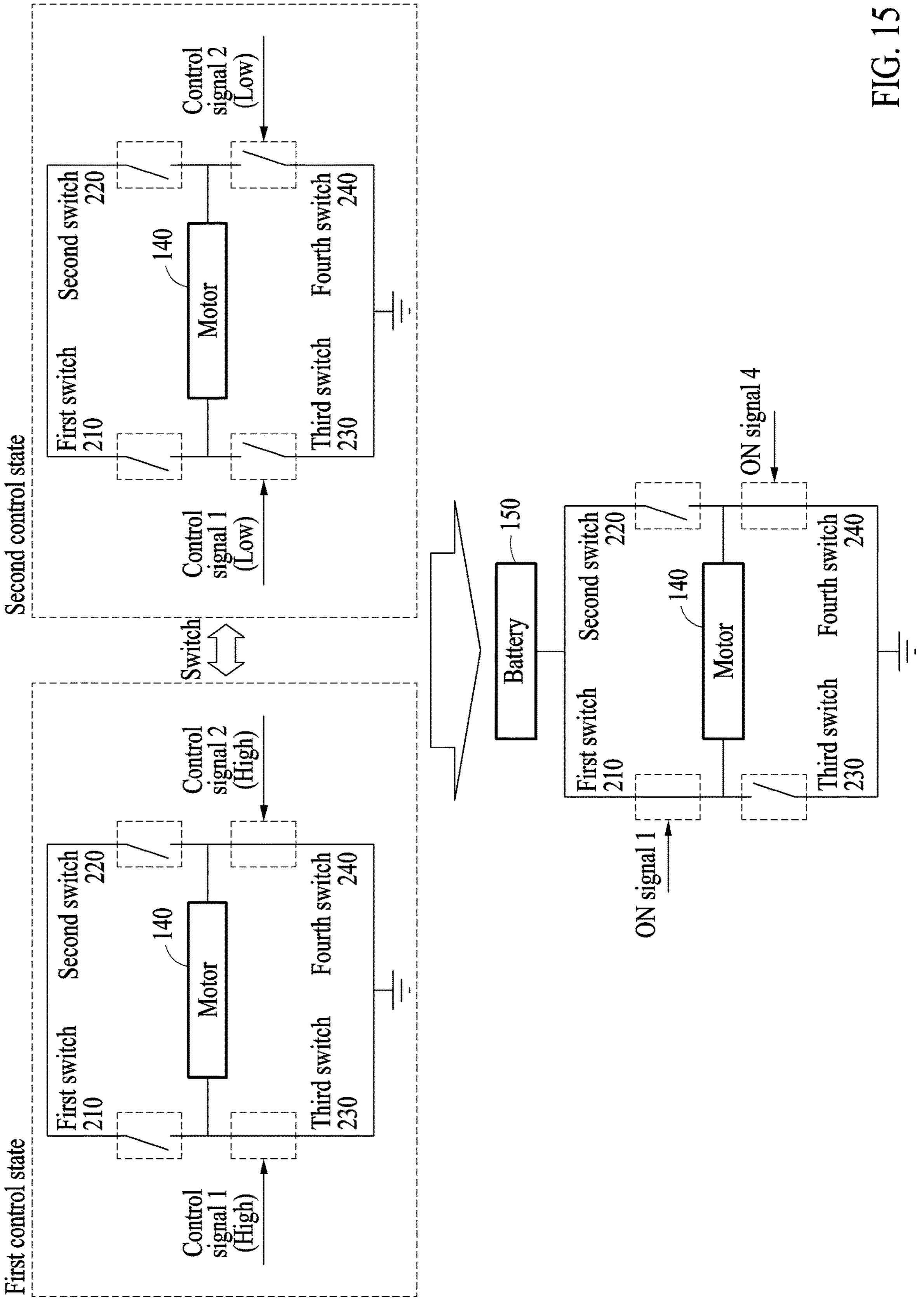
FIG. 15 is a diagram illustrating an example in which a wearable device outputs a resistance force using power of a battery while operating in a second resistance mode, according to example embodiments.

FIG. 15 is a diagram illustrating an example in which a wearable device outputs a resistance force using power of a battery while operating in a second resistance mode, according to example embodiments.

In the second resistance mode, the control state of the motor driver circuit 130 may be repeatedly switched between the first control state and the second control state. Here, the motor 140 may output a resistance force instead of receiving power from the battery 150.

According to example embodiments, the processor 120 may control the motor driver circuit 130 so that the motor 140 may temporarily receive power from the battery 150 and may output a resistance force in the second resistance mode.

For example, when a difference between a reference angle and a joint angle is greater than a predetermined angle (e.g., $\theta_{motion1}$ in the graph of FIG. 8B), a resistance force with a maximum intensity may be output. In this example, when the difference between the reference angle and the joint angle continues to increase, the processor 120 may temporarily apply an ON signal to each of the first switch 210 and the fourth switch 240 as shown in FIG. 15, instead of applying control signals 1 and 2 to the third switch 230 and the fourth switch 240, respectively, so that a user may exercise more intensely. The motor 140 may temporarily receive power from the battery 150 and may output a resistance force with an intensity greater than the maximum intensity of the second resistance mode.

In a situation in which the ON signal is applied to each of the first switch 210 and the fourth switch 240, when the difference between the reference angle and the joint angle decreases, the processor 120 may apply the control signals 1 and 2 to the third switch 230 and the fourth switch 240, respectively, instead of applying the ON signal to each of the first switch 210 and the fourth switch 240. Accordingly, the motor 140 may output the resistance force without a power supply from the battery 150.

The wearable device 100 may output a resistance force by temporarily using battery power in the second resistance mode so that the user may exercise more intensely in the second resistance mode.

Figure 16:
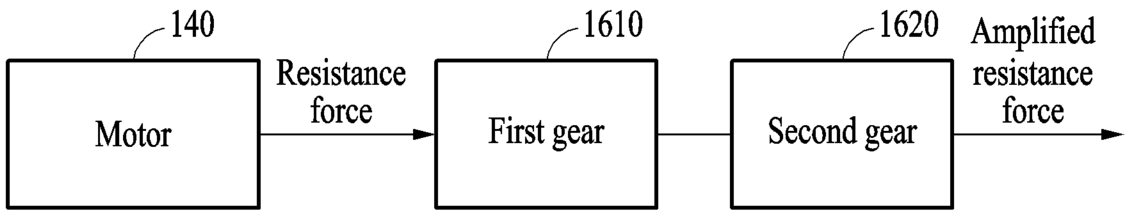
FIG. 16 is a diagram illustrating an amplification of a resistance force through a gear in a wearable device according to example embodiments.

FIG. 16 is a diagram illustrating an amplification of a resistance force through a gear in a wearable device according to example embodiments.

Referring to FIG. 16, a first gear 1610 is attached to a rotation shaft of the motor 140, and a second gear 1620 is connected to the first gear 1610.

Since a number of teeth of the second gear 1620 is greater than a number of teeth of the first gear 1610, a resistance force output from the motor 140 in the second resistance mode may be amplified by the first gear 1610 and the second gear 1620, and the amplified resistance force may be provided to a user. As understood by one of ordinary skill in the art, the example embodiments are not limited thereto, and a resistance force output from the motor 140 in the first resistance mode may be amplified by the first gear 1610 and the second gear 1620.

Figure 17A:
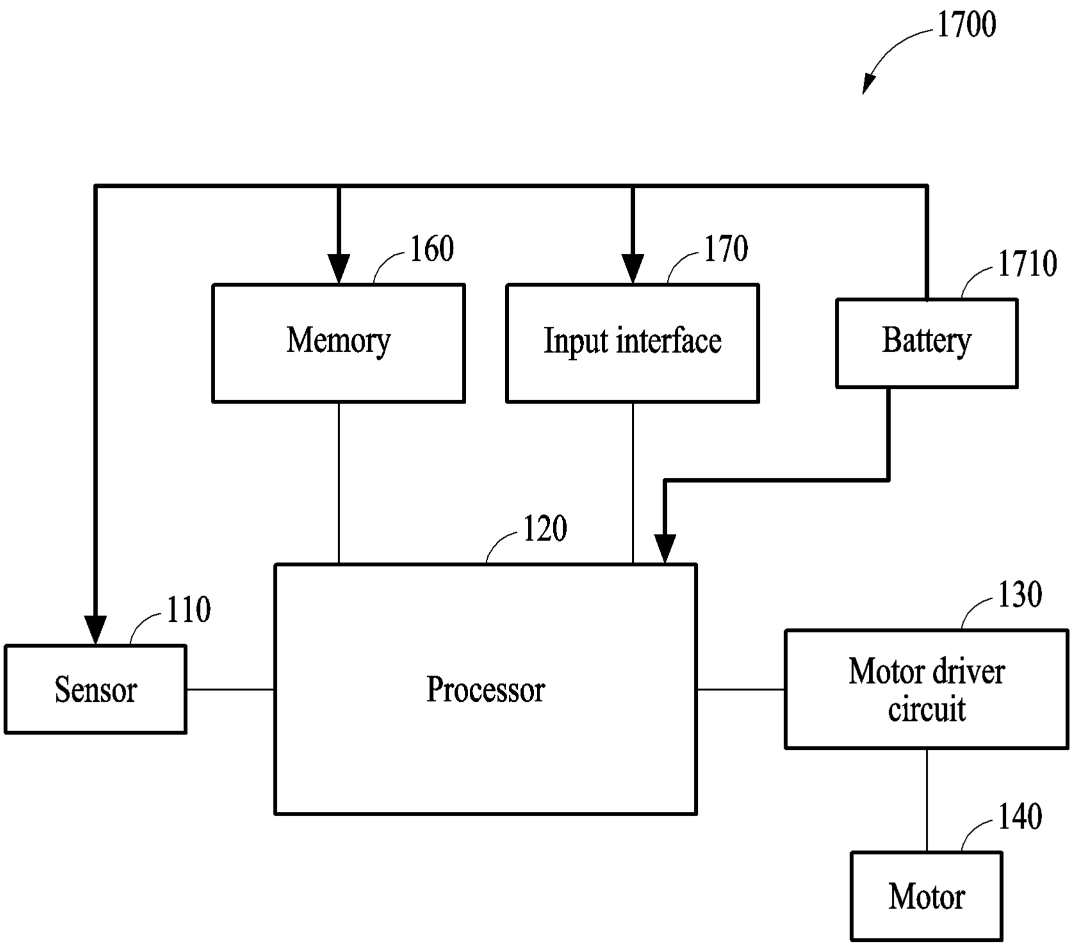
FIGS. 17A and 17B are diagrams illustrating examples of wearable devices according to example embodiments.
Figure 17B:
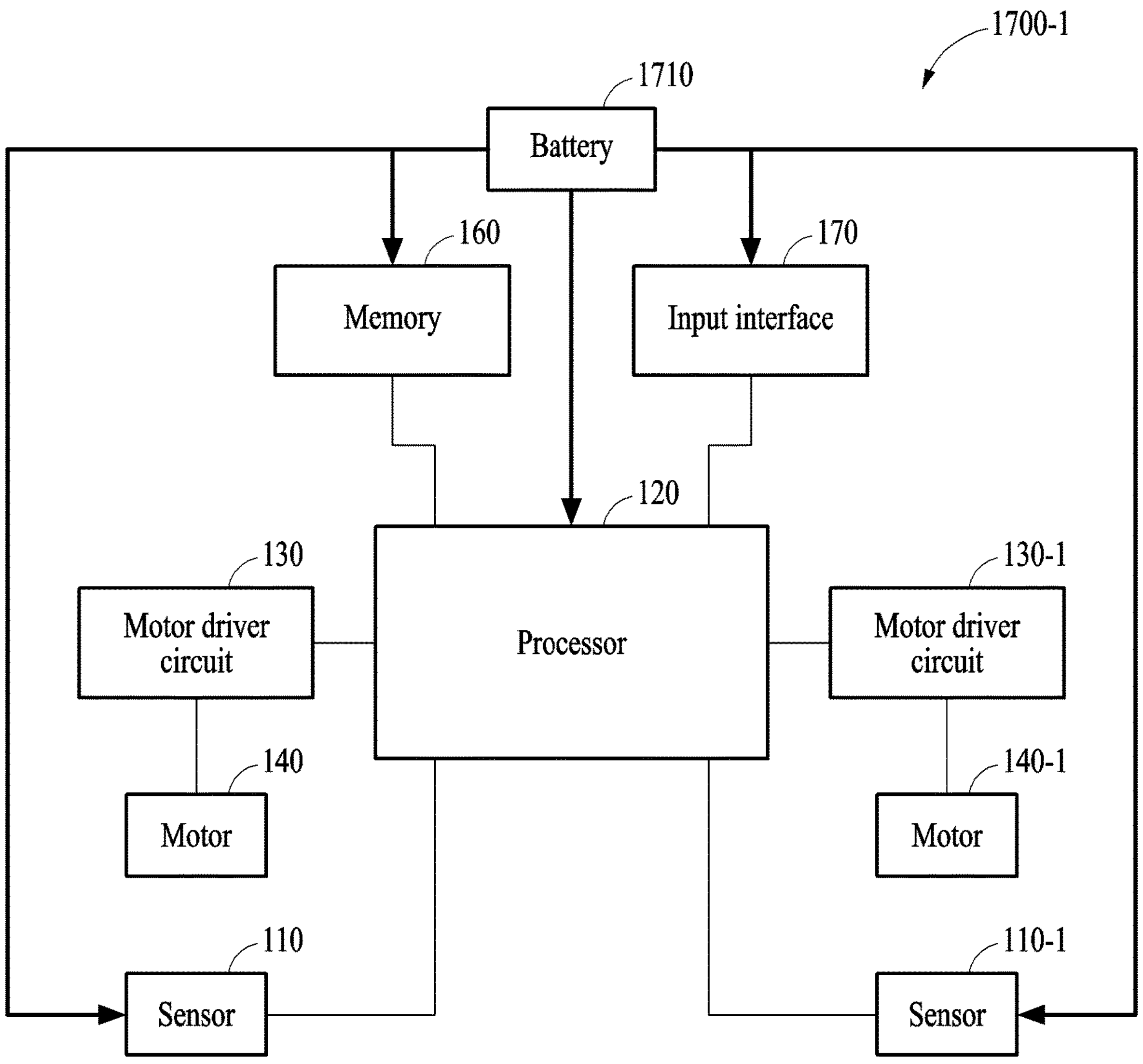

FIGS. 17A and 17B are diagrams illustrating examples of wearable devices according to example embodiments.

Referring to FIG. 17A, a wearable device 1700 may include a sensor 110, a processor 120, a motor driver circuit 130, a motor 140, a memory 160, an input interface 170, and a battery 1710. Referring to FIG. 17B, a wearable device 1700-1 may include a plurality of sensors 110 and 110-1, a processor 120, a plurality of motor driver circuits 130 and 130-1, motors 140 and 140-1, a memory 160, an input interface 170, and a battery 1710.

The wearable device 100 of FIG. 1A may operate in the first resistance mode as well as the second resistance mode, and thus, the motor 140 of the wearable device 100 of FIG. 1A may require battery power. The battery 150 of the wearable device 100 of FIG. 1A may correspond to a battery of a high voltage (e.g., 48.1 V).

The wearable device 1700 of FIG. 17A may be a device for the second resistance mode only. Since the motor 140 in the wearable device 1700 does not require battery power, the battery 1710 may correspond to a battery of a low voltage (e.g., 3.7 V).

In FIG. 17A, a thick arrow indicates a power supply of the battery 1710.

The battery 1710 may supply power to components of the wearable device 1700, for example, the sensor 110 and the processor 120. However, the battery 1710 may not supply power to the motor 140 of the wearable device 1700. The battery 1710 may be smaller in size than the battery 150 of the wearable device 100 of FIG. 1A, and thus, the wearable device 1700 may be lightened.

The wearable device 100-1 of FIG. 1B may operate in the first resistance mode as well as the second resistance mode, and thus, the motors 140 and 140-1 of the wearable device 100-1 of FIG. 1B may require battery power.

The wearable device 1700-1 of FIG. 17B may be a device for the second resistance mode only. Each of the motors 140 and 140-1 in the wearable device 1700-1 may not require battery power.

In FIG. 17B, a thick arrow indicates a power supply of the battery 1710.

The battery 1710 of the wearable device 1700-1 may supply power to components of the wearable device 1700-1. However, in FIG. 17B, the battery 1710 may not supply power to each of the motors 140 and 140-1 of the wearable device 1700-1. The battery 1710 of the wearable device 1700-1 may be smaller in size than the battery 150 of the wearable device 100 of FIG. 1B, and thus, the wearable device 1700-1 may be lightened.

The description provided with reference to FIGS. 1 through 16 may also apply to the description of FIGS. 17A and 17B, and accordingly, further description is omitted for conciseness.

The methods according to the above-described example embodiments may be recorded in non-transitory computer-readable media including program instructions to implement various operations of the above-described example embodiments. The media may also include, alone or in combination with the program instructions, data files, data structures, and any other media known to one of ordinary skill in the art. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs or floptical disks; and hardware devices that are specially configured to store and perform program instructions, such as read-only memory (ROM), random access memory (RAM), flash memory, and any other memory known to one of ordinary skill in the art. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While the example embodiments are described with reference to drawings, it is apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and/or equivalents of the claims are within the scope of the following claims.

What is claimed is:

1. A wearable device, comprising:

a motor including at least a first terminal and a second terminal;

a motor driver circuit;

a memory configured to store resistance force generation setting information indicating respective differences between a reference angle and respective joint angles and a corresponding relationship between respective duty ratios;

a sensor; and a processor configured to:

obtain, using the sensor, a joint angle of a user, determine a difference between the reference angle and the obtained joint angle, obtain a duty ratio of the respective duty ratios corresponding to the determined difference according to the resistance force generation setting information, and provide a control signal having the obtained duty ratio to the motor driver circuit to perform control such that a control state of the motor driver circuit is switched between a first control state and a second control state, wherein in the first control state, the first terminal and the second terminal of the motor are in an equipotential state such that a potential of the first terminal and a potential of the second terminal are equal to each other, and wherein in the second control state, the first terminal and the second terminal are electrically opened.

2. The wearable device of claim 1, wherein the processor is further configured to, based on the determined difference increasing, increase the obtained duty ratio according to the resistance force generation setting information.

3. The wearable device of claim 1, wherein the motor driver circuit comprises a first switch, a second switch, a third switch, and a fourth switch, wherein, in the second control state, the processor is further configured to turn off the first switch and the second switch and apply the control signal to the third switch and the fourth switch to switch the control state of the motor driver circuit to the second control state, and wherein the motor is not electrically connected to a battery included in the wearable device and is configured to output a resistance force by repeatedly turning on and off the third switch and the fourth switch according to the obtained duty ratio, when the first switch and the second switch are turned off.

4. The wearable device of claim 1, wherein the processor is further configured to, based on the determined difference being less than a set value, turn off switches included in the motor driver circuit such that the control state is the second control state.

5. The wearable device of claim 1, wherein the processor is further configured to:

determine whether a rotation direction of a joint of the user matches a predetermined direction, control the control state to be switched between the first control state and the second control state, based on determining that the rotation direction matches the predetermined direction, and turn off switches included in the motor driver circuit such that the control state is the second control state, based on determining that the rotation direction does not match the predetermined direction.

6. The wearable device of claim 1, wherein the processor is further configured to change the reference angle based on a user input.

7. The wearable device of claim 1, wherein the motor is configured to output a resistance force as the control state is switched between the first control state and the second control state, and wherein the output resistance force is amplified through a first gear attached to a rotation shaft of the motor and a second gear connected to the first gear.

8. A wearable device comprising:

a battery;

a motor including at least a first terminal and a second terminal;

a motor driver circuit;

a memory configured to store resistance force generation setting information indicating respective differences between a reference angle and respective joint angles and a corresponding relationship between respective duty ratios;

a sensor; and a processor configured to:

control the motor driver circuit such that the motor outputs a first resistance force based on power supplied from the battery in a first resistance mode, block an electrical connection between the motor and the battery in a second resistance mode, and control the motor driver circuit such that the motor outputs a second resistance force without receiving the power from the battery, wherein, in the second resistance mode, the processor is configured to:

obtain a joint angle of a user, using the sensor, determine a difference between the reference angle and the obtained joint angle, obtain a duty ratio of the respective duty ratios corresponding to the determined difference according to the resistance force generation setting information, and provide a control signal having the obtained duty ratio to the motor driver circuit to perform control such that a control state of the motor driver circuit is switched between a first control state and a second control state, and wherein in the first control state, the first terminal and the second terminal of the motor are in an equipotential state such that a potential of the first terminal and terminal potential of the second terminal are equal to each other, and wherein in the second control state, the first terminal and the second terminal are electrically opened.

9. The wearable device of claim 8, wherein the processor is further configured to, based on the determined difference increasing, increase the obtained duty ratio according to the resistance force generation setting information.

10. The wearable device of claim 8, wherein the motor driver circuit comprises a first switch, a second switch, a third switch, and a fourth switch, wherein, in the second resistance mode, the processor is further configured to turn off the first switch and the second switch and apply the control signal having the obtained duty ratio to the third switch and the fourth switch, and wherein the motor is configured to output resistance force by repeatedly turning on and off the third switch and the fourth switch according to the obtained duty ratio.

11. The wearable device of claim 8, wherein, in the second resistance mode, the processor is further configured to, based on the determined difference being less than a set value, turn off switches included in the motor driver circuit such that the control state is the second control state.

12. The wearable device of claim 8, wherein the processor is further configured to:

determine whether a rotation direction of a joint of the user matches a predetermined direction, control the control state to be switched between the first control state and the second control state, based on determining that the rotation direction matches the predetermined direction, and turn off switches included in the motor driver circuit such that the control state is the second control state, based on determining the rotation direction does not match the predetermined direction.

13. The wearable device of claim 8, wherein the motor is configured to:

output the second resistance force as the control state is switched between the first control state and the second control state, and the output second resistance force is amplified through a first gear attached to a rotation shaft of the motor and a second gear connected to the first gear.

14. The wearable device of claim 8, wherein the processor is further configured to, based on the determined difference increasing while a maximum intensity resistance force in the second resistance mode is being output to the user, control the motor driver circuit such that the motor outputs a resistance force with an intensity greater than the maximum intensity the maximum intensity based on the power received from the battery.

15. A method of controlling a wearable device, the method comprising:

obtaining a joint angle of a user using a sensor of the wearable device;

determining a difference between a reference angle and the obtained joint angle;

obtaining a duty ratio corresponding to the determined difference according to resistance force generation setting information indicating respective differences between the reference angle and respective joint angles and a corresponding relationship between respective duty ratios; and providing a control signal having the obtained duty ratio to a motor driver circuit of the wearable device to perform control such that a control state of the motor driver circuit is switched between a first control state and a second control state, wherein in the first control state, a first terminal and a second terminal of a motor of the wearable device are in an equipotential state such that a potential of the first terminal and a potential of the second terminal are equal to each other, and wherein in the second control state, the first terminal and the second terminal are electrically opened.

16. The method of claim 15, further comprising:

increasing the obtained duty ratio according to the resistance force generation setting information based on the determined difference increasing.

17. The method of claim 15, wherein the motor driver circuit comprises a first switch, a second switch, a third switch, and a fourth switch, and wherein the method further comprises:

in the second control state, turning off the first switch and the second switch and applying the control signal to the third switch and the fourth switch, and in a state in which the motor is not electrically connected to a battery included in the wearable device and based on the first switch and the second switch being turned off, outputting a resistance force by repeatedly turning on and off the third switch and the fourth switch according to the obtained duty ratio.

18. The method of claim 15, further comprising:

based on the determined difference being less than a set value, turning off switches included in the motor driver circuit such that the control state is the second control state.

19. The method of claim 15, further comprising:

determining whether a rotation direction of a joint of the user matches a predetermined direction;

based on determining that the rotation direction matches the predetermined direction, switching the control state between the first control state and the second control state; and based on determining that the rotation direction does not match the predetermined direction, turning off switches included in the motor driver circuit such that the control state is the second control state.

20. The method of claim 15, further comprising:

changing the reference angle based on a user input.

* * * * *